US008930064B2

(12) United States Patent
Merg et al.

(10) Patent No.: US 8,930,064 B2
(45) Date of Patent: Jan. 6, 2015

(54) METHOD AND SYSTEM FOR AUTOMATED AND MANUAL DATA CAPTURE CONFIGURATION

(75) Inventors: Patrick S. Merg, Hollister, CA (US); Brendan J. O'Mahony, Mallow (IE); R. Steven Brozovich, Campbell, CA (US)

(73) Assignee: Snap-on Incorporated, Kenosha, WI (US)

( * ) Notice: Subject to any disclaimer, the term of this patent is extended or adjusted under 35 U.S.C. 154(b) by 37 days.

(21) Appl. No.: 13/283,340

(22) Filed: Oct. 27, 2011

(65) Prior Publication Data

US 2013/0110344 A1 May 2, 2013

(51) Int. Cl.
*G01M 17/00* (2006.01)
*G07C 5/00* (2006.01)
*G07C 5/08* (2006.01)

(52) U.S. Cl.
CPC ................ *G07C 5/008* (2013.01); *G07C 5/085* (2013.01); *G07C 5/0808* (2013.01)
USPC ........ 701/31.4; 701/29.1; 701/29.6; 701/31.5

(58) Field of Classification Search
None
See application file for complete search history.

(56) References Cited

U.S. PATENT DOCUMENTS 6,434,455 B1 * 8/2002 Snow et al. .................. 701/31.4
7,751,955 B2 * 7/2010 Chinnadurai et al. ....... 701/29.3
8,296,007 B2 * 10/2012 Swaminathan et al. ..... 701/29.1
2002/0007237 A1 1/2002 Phung et al.
2005/0080606 A1 4/2005 Ampunan et al.
2008/0306645 A1 12/2008 Dewhurst et al.
2009/0043887 A1 * 2/2009 Coekaerts .................... 709/224
2009/0259358 A1 10/2009 Andreasen
2011/0035094 A1 2/2011 Van Den Berg et al.
2011/0039528 A1 2/2011 Yi et al.

FOREIGN PATENT DOCUMENTS

EP 2239699 A2 10/2010

OTHER PUBLICATIONS

Standard Deviation, downloaded from the World Wide Web on Aug. 16, 2011 at http://en.wikipedia.org/wiki/Standard_Deviation.
Statistics, downloaded from the World Wide Web on Aug. 16, 2011 at http://en.wikipedia.org/wiki/Statistics.
File:The Normal Distribution.svg, downloaded from the World Wide Web on Aug. 16, 2011 at http://en.wikipedia.org/wiki/File:The_Normal_Distribution.svg.

(Continued)

*Primary Examiner* — John Q. Nguyen
*Assistant Examiner* — Edward Torchinsky
(74) *Attorney, Agent, or Firm* — McDonnell Boehnen Hulbert & Berghoff LLP

(57) ABSTRACT

A client and server are operable within a community of clients for transferring vehicle diagnostic data captured from vehicles. The server includes a central library for storing captured vehicle data (CVD) prior to receiving client requests for CVD from the central library to compare to CVD within a client's local library. The client request may include vehicle identification data and client settings so that the CVD provided to the client is from another client configured to the same client settings and from a type of vehicle that matches a vehicle-type identified by the vehicle identification data. Alert requests transmitted by a client or server can be received by a client or a remote alert device to provide notice that another client has requested CVD. CVD can be associated with data tags that reduce the burden in locating the CVD and include data relating to the capture of the CVD.

17 Claims, 17 Drawing Sheets

(56) References Cited

OTHER PUBLICATIONS

European Patent Office, P.B. 5818 Patentlaan 2, NL-2280 HV Rijswijk, Notification of Transmittal of the International Search Report and the Written Opinion of the International Searching Authority, or the Declaration, mailed for International Application No. PCT/US2012/061860 on Feb. 14, 2013.

European Patent Office, P.B. 5818 Patentlaan 2, NL-2280 HV Rijswijk, Patent Cooperation Treaty PCT International Search Report, mailed for International Application No. PCT/US2012/061860 on Feb. 14, 2013.

European Patent Office, P.B. 5818 Patentlaan 2, NL-2280 HV Rijswijk, Patent Cooperation Treaty PCT Written Opinion of the International Search Authority (PCT Rule 43bis.1), mailed for International Application No. PCT/US2012/061860 on Feb. 14, 2013.

GM mode $06 data definitions for GM vehicles using GMLAN diagnostic data link. Rev. 3, Feb. 5, 2007.

D.Marshall, Mode $06 data definitions for GM vehicles using J1850/Class2 diagnostic data link, Rev. 3, Feb. 16, 2010.

Crankshaft Position Sensor, downloaded from the World Wide Web at http://arrc.epnet.com/autoapp/8963/8963CH04_Crankshaft_Position_Sensor.htm on Jun. 21, 2011.

Carley, Larry, Mode $06 Diagnostic Update, downloaded from the World Wide Web at http://www.underhoodservice.com/Article/46504,mode_06_diagnostic_update.aspx, Nov. 1, 2008.

* cited by examiner

| | Vehicle 1 | Vehicle 2 | Vehicle 3 | Vehicle 4 | Vehicle 5 | Vehicle 6 | Vehicle N | Mean / Std. Dev. |
|---|---|---|---|---|---|---|---|---|
| Sample 1 | 1.0 | 1.0 | 1.0 | 1.0 | 1.0 | 1.0 | 1.0 | 1.0 / 0.00 |
| Sample 2 | 1.2 | 1.5 | 1.3 | 1.0 | 1.6 | 0.9 | 1.5 | 1.3 / 0.09 |
| Sample 3 | 1.6 | 1.9 | 1.8 | 2.1 | 2.2 | 1.0 | 2.0 | 1.8 / 0.16 |
| Sample 4 | 1.6 | 2.4 | 2.4 | 2.8 | 2.8 | 0.7 | 3.6 | 2.3 / 0.88 |
| Sample 5 | 2.2 | 3.2 | 3.3 | 3.7 | 3.8 | 1.4 | 3.8 | 3.1 / 0.84 |
| Sample 6 | 2.8 | 5.0 | 4.8 | 5.2 | 5.0 | 3.7 | 5.1 | 4.5 / 0.83 |
| Sample 7 | 5.0 | 5.0 | 4.9 | 5.5 | 4.9 | 3.7 | 5.4 | 4.9 / 0.35 |
| Sample 8 | 4.1 | 4.5 | 4.4 | 5.0 | 4.6 | 2.6 | 4.4 | 4.2 / 0.59 |
| Sample 9 | 3.3 | 3.2 | 3.0 | 3.6 | 3.0 | 0.0 | 3.5 | 2.8 / 1.58 |
| Sample N | 0.5 | 3.0 | 2.8 | 3.2 | 3.1 | 0.0 | 3.2 | 2.3 / 1.92 |
| Var. Sum | 6.1 | 2.5 | 1.6 | 5.5 | 3.8 | 13.2 | 5.3 | |
| # within 1 St. Dev. | 5 | 9 | 10 | 5 | 8 | 2 | 5 | |

FIG. 18

METHOD AND SYSTEM FOR AUTOMATED AND MANUAL DATA CAPTURE CONFIGURATION

BACKGROUND

Vehicles, such as automobiles, light-duty trucks, and heavy-duty trucks, play an important role in the lives of many people. To keep vehicles operational, some of those people rely on vehicle technicians to diagnose and repair their vehicle.

Vehicle technicians use a variety of tools in order to diagnose and/or repair vehicles. Those tools may include common hand tools, such as wrenches, hammers, pliers, screwdrivers and socket sets, or more vehicle-specific tools, such as cylinder hones, piston ring compressors, and vehicle brake tools. The tools used by vehicle technicians may also include electronic tools such as a digital voltage-ohm meter (DVOM) or a vehicle scan tool that communicates with an electronic control unit (ECU) within a vehicle.

Quite often, a vehicle technician captures vehicle data from a vehicle, but the technician is not sure whether the captured vehicle data (CVD) indicates that the vehicle is functioning normally or is malfunctioning. Furthermore, the technician that captured the vehicle data may be under pressure to repair the vehicle quickly as well as correctly the first time without having the vehicle come back for a follow-up visit for additional diagnosis and repair. Accordingly, it would be beneficial if the technician could quickly access other vehicle data to which the technician could compare the vehicle data captured by the technician for assessing whether the CVD matches the other data and to be guided in how to interpret the CVD.

OVERVIEW

Example embodiments are described herein. In one respect, an example embodiment is arranged as a client system for vehicle diagnostics, the client system comprising a non-transitory computer-readable medium, and program instructions stored at the non-transitory computer-readable medium and executable by at least one processor to (i) receive, via a client/vehicle interface, vehicle data storable in the non-transitory computer-readable medium as first captured vehicle data for a vehicle, (ii) associate a first set of one or more data tags with the first captured vehicle data, and (iii) cause a network interface to transmit a requested-data message to a vehicle-diagnostic server for storage in a network-based vehicle-diagnostics database that provides captured vehicle data collected from a community of client systems, wherein the requested-data message comprises the first captured vehicle data for the vehicle and the first set of one or more associated data tags.

In another respect, an example embodiment is arranged as a server system for vehicle diagnostics, the server system comprising a non-transitory computer-readable medium, and program instructions stored on the non-transitory computer-readable medium and executable by at least one processor to (i) receive, via a network interface, requested-data messages from vehicle-diagnostic client systems, wherein each requested-data message comprises captured vehicle data and a set of one or more associated data tags, (ii) maintain a network-based vehicle-diagnostics database, wherein the captured vehicle data from the requested-data messages are categorized in the vehicle-diagnostics database based on the respectively associated data tags, (iii) receive a first data-request message from a first vehicle-diagnostic client system, wherein the first data-request message comprises a first set of one or more data tags, (iv) generate a first requested-data message that comprises first captured vehicle data that is based on second captured vehicle data stored at the network-based vehicle-diagnostics database and that is associated with a second set of data tags that matches the first set of one or more data tags, and (v) cause the network interface to transmit the first requested-data message to the first vehicle-diagnostic client system.

In yet another respect, an example embodiment is arranged as a method comprising (i) a vehicle-diagnostic client system determining vehicle information that indicates a given vehicle is a particular type of vehicle, (ii) the vehicle-diagnostic client system transmitting a status message destined for a vehicle-diagnostic server, the status message comprising the vehicle information determined by the vehicle-diagnostic client system, (iii) the vehicle-diagnostic client system receiving a data-request message, the data-request message comprising a first set of data tags including client setting tags for configuring the vehicle-diagnostic client system to capture first vehicle data from the given vehicle, (iv) the vehicle-diagnostic client system configuring client settings of the vehicle-diagnostic client system to match client settings identified by the client setting tags and then capturing the first vehicle data while configured with the client setting that match the client settings identified by the client setting tags, (v) the vehicle-diagnostic client system associating a second set of data tags with the captured first vehicle data, wherein the second set of data tags include client setting tags that indicate how the vehicle-diagnostic client system was configured while capturing the first vehicle data, and (vi) the vehicle-diagnostic client system transmitting a requested-data message addressed to the vehicle-diagnostic server, wherein the requested-data message comprises the captured first vehicle data and the second set of data tags.

In still yet another respect, an example embodiment is arranged as a method comprising (i) a vehicle-diagnostic server receiving a status message, wherein the status message comprises a source identifier associated with a first vehicle-diagnostic client system and comprises a vehicle identifier that identifies a particular vehicle-type of a given vehicle, (ii) the vehicle-diagnostic server receiving a first data-request message, wherein the first data-request message comprises a source identifier associated with a second vehicle-diagnostic client system and comprises client setting tags for configuring a vehicle-diagnostic client system and vehicle identifier tags that identifies the particular vehicle-type, (iii) the vehicle-diagnostic server transmitting a second data-request message, wherein the second data-request message comprises a destination identifier associated with the first vehicle-diagnostic client system and comprises the client setting tags for configuring a vehicle-diagnostic client system and the vehicle identifier tags that identifies the particular vehicle-type, (iv) the vehicle-diagnostic server receiving a first requested-data message, wherein the first requested-data message comprises a source identifier associated with the first vehicle-diagnostic client system and comprises vehicle data that the first vehicle-diagnostic client system captured from the given vehicle while configured to client setting represented by the client setting tags, and (v) the vehicle-diagnostic server transmitting a second requested-data message, wherein the second requested-data message comprises a destination identifier associated with the second vehicle-diagnostic client system and comprises the vehicle data that the first vehicle-diagnostic client system captured from the given vehicle while configured to client setting represented by the client setting tags.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings, in which:

FIG. 18 illustrates an example of captured vehicle data for a given category.

DETAILED DESCRIPTION

I. Introduction

Figure 1:
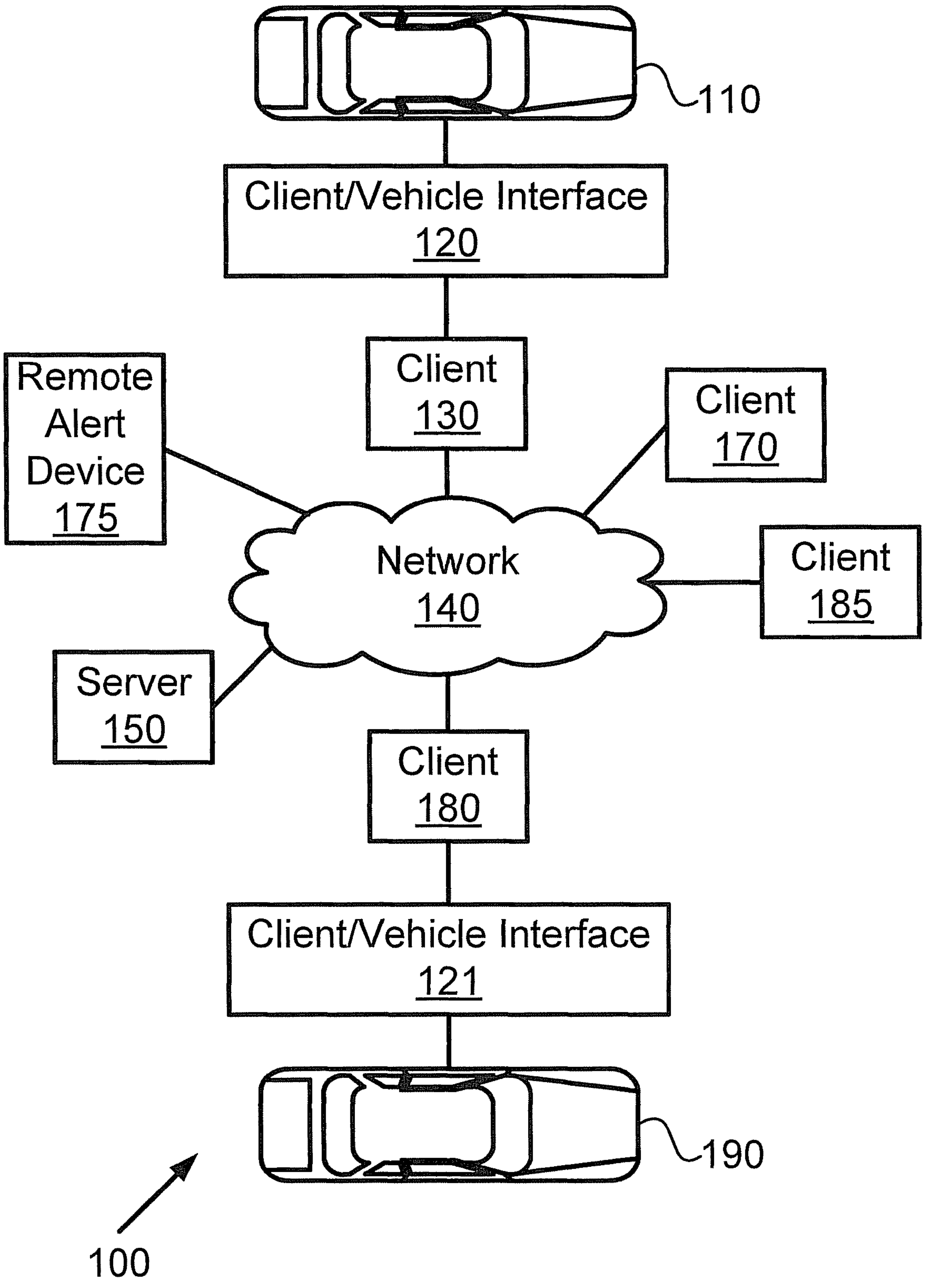
FIG. 1 is a block diagram of a system in accordance with an example embodiment.

FIG. 1 illustrates an example system 100 comprising client/vehicle interfaces 120 and 121, a client system (or more simply, a client) 130, clients 170, 180, and 185, a network 140, a server system (or more simply, a server) 150, and a remote alert device 175. FIG. 1 also illustrates vehicles 110 and 190 that interface to and/or with system 100 via, for example, client/vehicle interfaces 120 and 121, respectively. Clients 170 and 185 may each communicatively couple to a respective vehicle via a respective client/vehicle interface (not shown) for capturing vehicle data from the vehicle communicatively coupled to the client. Each client/vehicle interface, including client/vehicle interfaces 120 and 121, may communicatively couple a client to a vehicle using any of a variety of wired and/or wireless communication means, such as any of those described hereinafter.

For purposes of this description, a vehicle (e.g., vehicle 110 or 190) may comprise an automobile, a motorcycle, a semi-tractor, a light-duty truck, a medium-duty truck, a heavy-duty truck, farm machinery, a boat or ship, an airplane, or some other type of vehicle operable to transport objects (e.g., goods or people). System 100 is operable to carry out a variety of functions, including functions for diagnosing vehicles. The example embodiments described herein may include or be utilized with any appropriate voltage or current source, such as a battery, an alternator, a fuel cell, and the like, providing any appropriate current and/or voltage, such as about 12 volts, about 42 volts, and the like. The example embodiments may include or be used with any desired system or engine. Those systems or engines may comprise items utilizing fossil fuels, such as gasoline, natural gas, propane, and the like, electricity, such as that generated by battery, magneto, fuel cell, solar cell and the like, wind and hybrids or combinations thereof.

Network 140 may comprise one or more networks. Each of those one or more networks may comprise a wireless network, a wired network, or a combination of wired and wireless networks. As an example, network 140 may comprise a wireless access network by which devices of network 140 communicatively connect to other networks of network 140. As yet another example, network 140 may comprise one or more networks within the Internet. As still yet another example, network 140 may include a wireless cellular network that allows for communication according to a wireless protocol such as 1x Evolution Data Optimized (1x Ev-DO), perhaps in conformance with one or more industry specifications such as IS-856, Revision 0, IS-856, Revision A, and IS-856, Revision B. Other wireless protocols may be used as well, such as Code Division Multiple Access (CDMA), Global System for Mobile Communications (GSM), Time Division Multiple Access (TDMA), or some other wireless protocol.

Clients 130, 170, 180, and 185 are operable as clients among a community of clients that communicate with server 150 via network 140. Each client is operable to capture data from vehicles and to associate data tags with the captured vehicle data (CVD). The CVD and the associated data tags can be stored locally in the client that captured the CVD. Additionally or alternatively, the CVD and the associated data tags can be stored at a data storage device accessible to server 150 (e.g., server data storage 160 shown in FIG. 2). Subsequent to server 150 storing the CVD, server 150 can provide the stored CVD to another client that requests the CVD. The other client can present (e.g., display) the CVD received from server 150 in the same manner that the other client can present CVD captured by that client.

Remote alert device 175 is adapted to receive alerts from a client or server 150 and to present received alerts to a user of remote alert device 175. Server 150 may generate an alert in response to receiving a data-request message from client 130. Server 150 may transmit the alert to active clients (e.g., active clients that did not request the vehicle data) to notify users of those active clients that server 150 has received a request for CVD. Server 150 may also transmit the alert to remote alert device 175 to provide the same notice to a user of remote alert device 175. Alternatively, remote alert device 175 may receive the alert from a client associated with remote alert device 175. Remote alert device 175 may be arranged as a cellular phone, a personal digital assistant (PDA), a laptop or desktop personal computer, or some other type of device that can communicate to receive the alerts. Remote alert device 175 may also be operable to request and/or receive CVD from a client associated with remote alert device 175.

The example embodiments described herein provide beneficial functions that may include, but are not limited to, (i) capturing vehicle data and automatically tagging and categorizing the vehicle data for subsequent retrieval and presentation of the CVD, (ii) providing access to CVD stored locally at the client or at a central library remote from the client in a standard format, (iii) inputting personal user input tags for associating with CVD that can be shared with the community of clients, (iv) accessing CVD via a client or via a remote alert device, (v) auto-configuring a client to reduce the amount of manual configuration required for capturing requested vehicle data or to eliminate manual configuration of the client for capturing requested vehicle data, (vi) requesting and receiving CVD captured by clients of the community of clients, (vii) requesting clients within the community of client to capture vehicle data and receiving such CVD, (viii) analyzing CVD to generate statistical vehicle data for displaying at a client, and (ix) determining which CVD should be displayed at a client to represent a vehicle is operating normally.

II. Example Messaging

Various messages can be communicated between server 150 and the clients to carry out the transfer of CVD among the community of clients communicating via network 140. A person of ordinary skill in the art will understand that the transmission of data in one message could be split up for transmission of the data via multiple messages. In response to receiving any message from a client, server 150 may interpret receipt of the message as an indication that the client is an active client. If server 150 does not receive another message from that client within a threshold amount of time, server 150 may classify the client as an inactive client.

Figure 2:
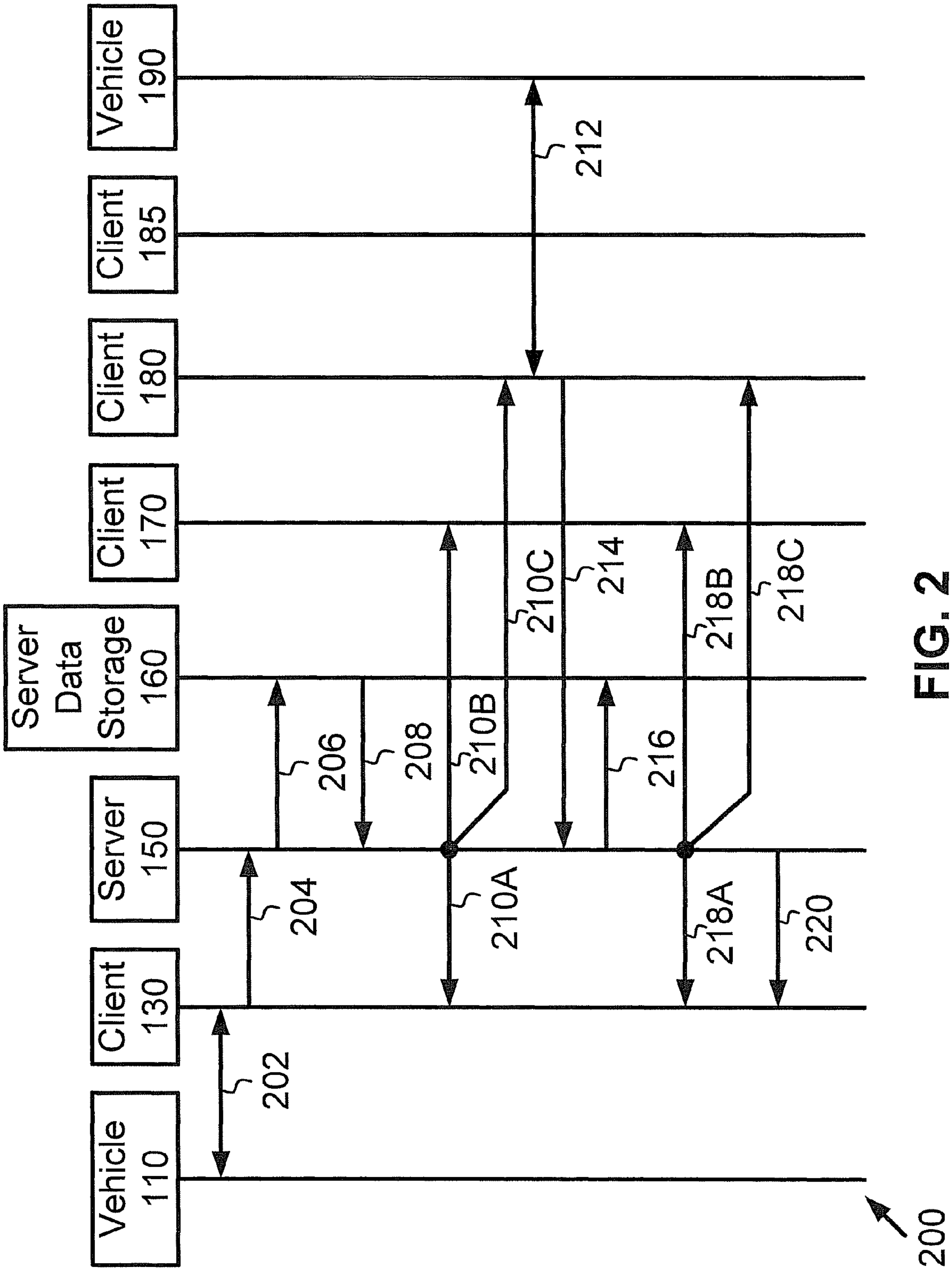
FIG. 2 is a diagram illustrating an example message flow.

FIG. 2 is a diagram illustrating an example message flow 200 that may be carried out by system 100. For purposes of example only, message flow 200 is described with respect to vehicle data comprising crankshaft position (CKP) sensor data that identifies a position of a crankshaft. A crankshaft is a component that translates reciprocating linear motion of pistons to a rotating motion within an engine, such as an internal combustion engine. A person having ordinary skill in the art will understand that message flow 200 is applicable to other types of vehicle data that a client can capture.

FIG. 2 illustrates server data storage 160. In one respect, server data storage 160 may comprise a non-transitory data storage device that is connected to network 140 at a location distinct from a network location of server 150. Server 150 and server data storage 160 may have distinct unique addresses and the messages illustrated as being sent between server 150 and server data storage 160 may comprise messages that are transmitted via network 140. In another respect, server 150 may comprise server data storage 160 such that server 150 and server data storage 160 connect to network 140 at a common location and use a single unique address. In that respect, server 150 may be arranged as a server 600 (shown in FIG. 6) such that server data storage 160 comprises data storage device 608 (shown in FIG. 6), and the messages illustrated as being sent between server 150 and server data storage 160 may comprise messages that are transmitted via a system bus 610 (shown in FIG. 6).

Messages 202 are client/vehicle messages comprising one or more messages that client 130 transmits to vehicle 110 and/or one or more messages that vehicle 110 transmits to client 130. Messages 202 may include messages that client 130 transmits to request data (e.g., CKP sensor data) from vehicle 110. Messages 202 may include messages that client 130 receives from vehicle 110 to receive data requested from vehicle 110, such as CKP sensor data and data to determine the vehicle-type of vehicle 110. A person having ordinary skill in the art will understand that transmission of one or more messages of messages 202 may occur before, while, or after transmitting one or more other messages illustrated in FIG. 2.

Message 204 is a data-request message that client 130 transmits to server 150 via network 140. Data-request message 204 may be arranged as a data-request message 700, which is described below and shown in FIG. 7. In that regard, for example, data-request message 204 may comprise (i) a destination ID field 710 that identifies an ID of server 150, (ii) a source ID field 720 that identifies an ID of client 130, (iii) a request ID field 730 that identifies a unique request ID that client 130 and server 150 can subsequently use to determine that CVD is associated with a data request of data-request message 204, and (iv) a data tags field 740. For purposes of this description, the data associated with the data request of data-request message 204 is CKP sensor data.

Figure 10:
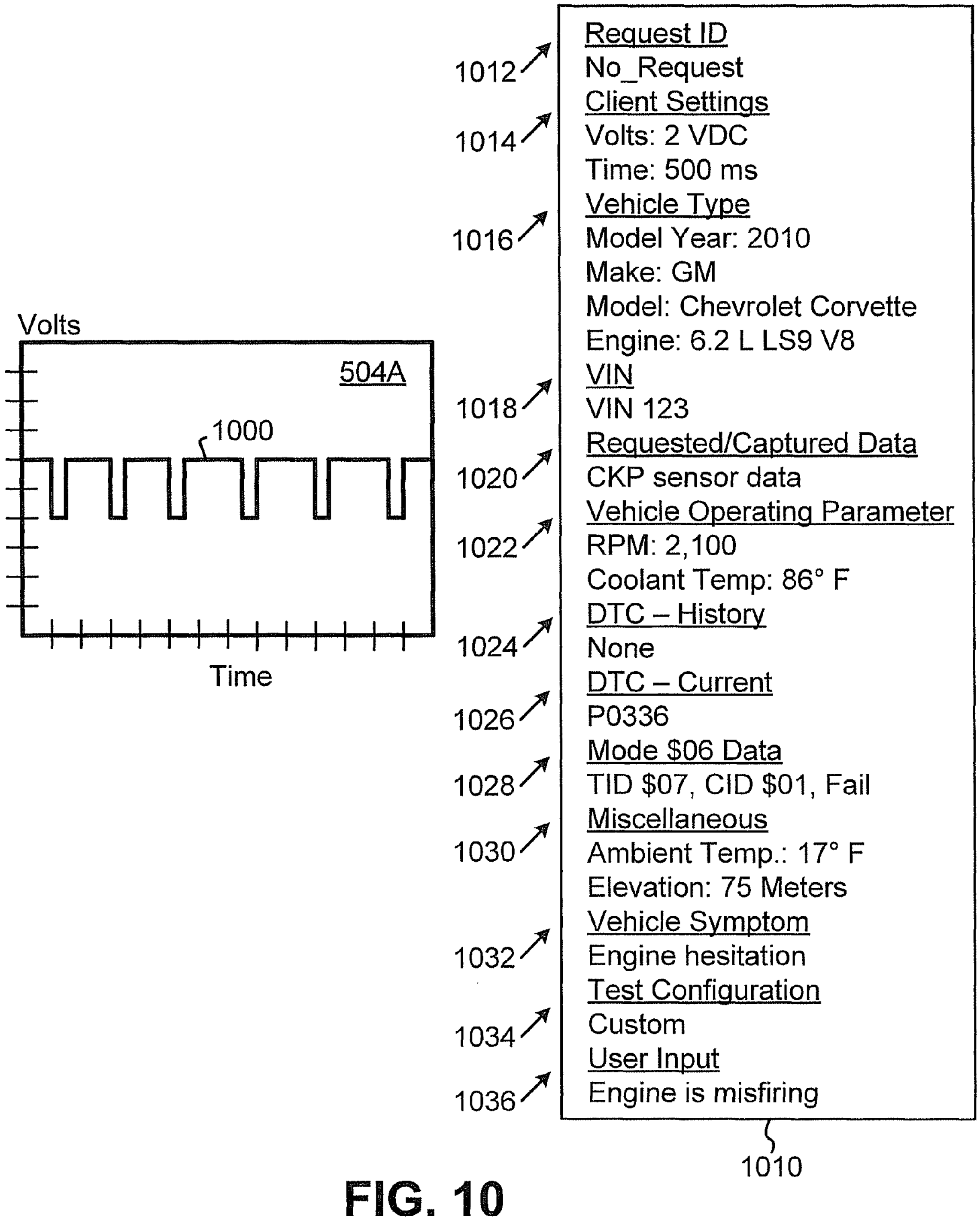
FIG. 10 illustrates example vehicle data captured by a client and data tags associated with the captured vehicle data.

Data tags field 740 may, for example, include one or more data tags of data tags 1010 shown in FIG. 10. The data tags used to define a request for CVD and thus the data tags included within data tags field 740 may differ depending on whether client 130 has captured, from vehicle 110, data for comparing to the CVD being requested by data-request message 204. In accordance with a first case in which client 130 has not yet captured vehicle data associated with data-request message 204, data tags field 740 may comprise a Request ID tag 1012, a Vehicle Type tag 1016, a VIN tag 1018, a Requested/CVD tag 1020, a Vehicle Symptom tag 1032, and a Test Configuration tag 1034. Other data tags, such as tags 1014, 1022, 1024, 1026, 1028, 1030, and 1036, may not be included or may be represented as null data in data request 204 since client 130 has not yet captured the CKP sensor data.

In accordance with a second case in which client 130 has captured vehicle data associated with data-request message 204 (e.g., the CKP sensor data) and in which client 130 sends data-request message 204 to request CVD for comparison to the CVD captured via client 130, data tags field 740 may include the other data tags of data tags 1010 listed above.

Message 206 is a data-search request message that server 150 transmits to server data storage 160. In one respect, server 150 may transmit data-search request message 206 via network 140. In that respect, data-search request message 206 may be arranged as a message that includes the same fields as data-request message 700 including destination ID field 710 comprising a unique address associated with server data storage 160, and source ID field 720 comprising a unique address associated with server 150. In another respect, server 150 may transmit data-search request message 206 via system bus 610. In this latter respect, data-search request message 206 may be arranged as a message that includes the request ID field 730 and data tags field 740 of data-request message 700, but that does not include the destination ID field 710 nor the source ID field 720.

Upon receiving data-search request message 206, server data storage 160 is responsively searched for determining whether it contains the requested CVD. In one case, sever data storage 160 contains the requested CVD. In that case, server data storage 160 provides the requested CVD to server 150. That case is described with regard to FIG. 3. In another case, server data storage 160 does not contain the requested CVD at the time data-search request message 206 is received, thus leading to transmission of additional messages, such as messages 208 through 224. In yet another case, server data storage 160 contains the requested CVD, but prior to transmitting the CVD to client 130, transmission of additional messages, such as messages 208 through 224, may occur so that server data storage 160 receives additional samples of the requested CVD from one or more other vehicles.

Message 208 is a data-search response message that server data storage 160 transmits to server 150 to provide notice that server data storage 160 does not contain the requested CVD or that additional CVD should be requested. Server data storage 160 may transmit data-search response message 208 via network 140 or via system bus 610. In accordance with either of those cases, data-search response message 208 may comprise a request ID comprising the unique request ID included within data-request message 204, and data that indicates the requested CVD is not contained with server data storage 160 or that additional CVD should be requested. Additionally, data-search response message 208 may include the data tags field included within data-request message 204. In accordance with the case in which data-search response message 208 is transmitted via network 140, data-search response message 208 may further comprise a destination ID that comprises a unique address associated with server 150, and a source ID that comprises a unique address associated with server data storage 160.

Messages 210A, 210B, and 210C are data-request messages. Server 150 may transmit each of those data-request messages in response to server 150 receiving data-search response message 208 with data that indicates server data storage 160 does not comprise the requested data or that additional CVD should be requested and server 150 determining from a client register 620 (shown in FIG. 6) that clients 130, 170, and 180 are active clients. In other words, server 150 broadcasts (e.g., transmits) the data-request message to all active registered clients. Transmission of a data-request message to an inactive registered client (e.g., client 185 as shown in Table 1 below) may not occur since the inactive client would not receive the data-request message. In an alternative embodiment, server 150 may not transmit data-request message 210A to client 130 since client 130 is the client that sent data-request message 204. Messages 210A, 210B, and 210C may be arranged like data-request message 700 using a respective destination address for clients 130, 170, and 180, and the same request ID identified in message 204.

Message 212 represents a data capture event carried out by client 180. As with previous messages, the CVD may comprise CKP sensor data or some other type of vehicle data. For purposes of this description, message 212 is also referred to as data capture event 212. In one respect, capturing vehicle data during data capture event 212 may be carried out via an encoded message request. For instance, data capture event 212 may include client 180 transmitting one or more messages to vehicle 190 to request vehicle data, and vehicle 190 transmitting one or more messages to client 180 with the requested vehicle data. Client 180 captures the requested vehicle data sent to client 180 from vehicle 190. In another respect, capturing vehicle data during data capture event 212 may be carried out as a non-encoded message request as described below with respect to a vehicle interface 506 shown in FIG. 5.

Figure 8:
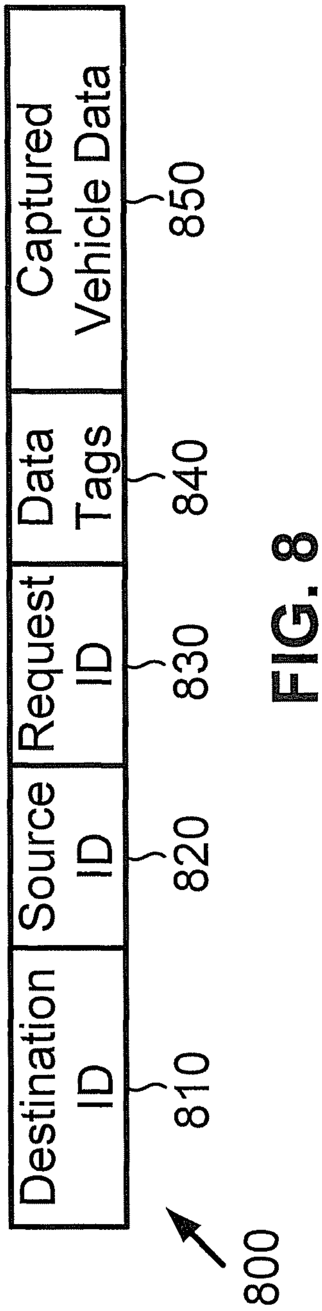
FIG. 8 is a diagram illustrating another example message that can be communicated within the system illustrated in FIG. 1.

Message 214 is a requested-data message that client 180 transmits to server 150 so as to provide server 150 with CVD requested via data-request message 210C. Requested-data message 214 may be arranged as a requested-data message 800, which is described below and is illustrated in FIG. 8. In that regard, for example, requested-data message 214 may comprise (i) a destination ID field 810 that indicates a unique address associated with server 150, (ii) a source ID field 820 that indicates a unique address associated with client 180, (iii) a request ID field 830 that is the same as a request ID in data-request message 210C, (iv) a data tags field 840 that comprises data tags that client 180 associated with requested data that client 180 captured from vehicle 190 in response to data-request message 210C, and (v) a CVD field 850 that comprises CVD that client 180 captured from vehicle 190 in response to data-request message 210C. The data tags in the data tags field of requested-data message 214 may comprise one or more data tags shown in FIG. 10, as well as one or more other types of data tags that can be associated with CVD.

As an example, the unique address associated with server 150 may comprise a unique Internet Protocol (IP) address or a unique combination of IP address and User Data Protocol (UDP) port. Similarly, the unique address associated with a client (e.g., client 180) may comprise a unique IP address or a unique combination of IP address and UDP port. Other examples of a unique address associated with a server or the unique address associated with a client are also possible.

Message 216 is a data storage request message that server 150 transmits to server data storage 160. In accordance with message flow 200, message 216 comprises CVD that server 150 received from client 180 via requested-data message 214. The CVD within data storage request message 216 may be associated with one or more data tags that server 150 or client 180 assigned to the CVD. The CVD within data storage request message 216 may include the CVD contained within CVD field 850 that server 150 received via requested-data message 214.

Figure 9:
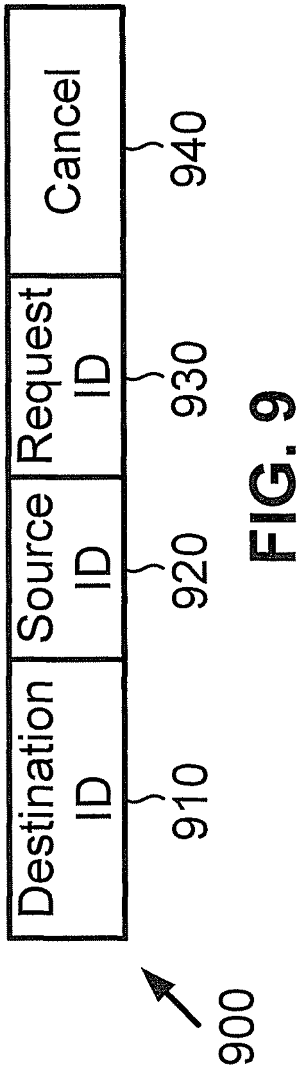
FIG. 9 is a diagram illustrating another example message that can be communicated within the system illustrated in FIG. 1.

Messages 218A, 218B, and 218C are data-request cancellation messages to cancel the previous data requests sent via request messages 210A, 210B, and 210C. Messages 218A, 218B, and 218C may be arranged as data-request cancellation message 900, which is described below and is illustrated in FIG. 9. In that regard, messages 218A, 218B, and 218C may each include a destination ID field (e.g., field 910) that identifies the respective client destination for messages 218A, 218B, and 218C. Messages 218A, 218B, and 218C provide clients with notice that the requested data has been received and/or is no longer being requested. Messages 218A, 218B, and 218C may be referred to as broadcast cancellation messages as the same cancellation is being sent to multiple clients.

In an alternative arrangement, server 150 may not transmit messages 218A, 218B, and 218C such that users of clients receiving data-request messages 210A, 210B, and 210C may be more inclined to capture the requested vehicle data. In yet another alternative arrangement, server 150 may postpone transmitting messages 218A, 218B, and 218C until after making a determination that the CVD in the central library 622 includes CVD from at least a threshold number of vehicles, such as 30 vehicles or some other number of vehicles.

Message 220 is a requested-data message that server 150 transmits to client 130 so as to provide client 130 with data requested via data-request message 204. Requested-data message 220 may be arranged as requested-data message 800. In that regard, for example, requested-data message 220 may comprise (i) a destination ID field 810 that indicates a unique address associated with client 130, (ii) a source ID field 820 that indicates a unique address associated with server 150, (iii) a request ID field 830 that is the same as a request ID field in data-request messages 204 and 214, (iv) a data tag field 840 that comprises data tags that client 180 associated with CVD that client 180 captured from vehicle 190 in response to data-request message 210C, and (v) a requested data field 850 that comprises the CVD that client 180 captured from vehicle 190 in response to data-request message 210C.

Figure 3:
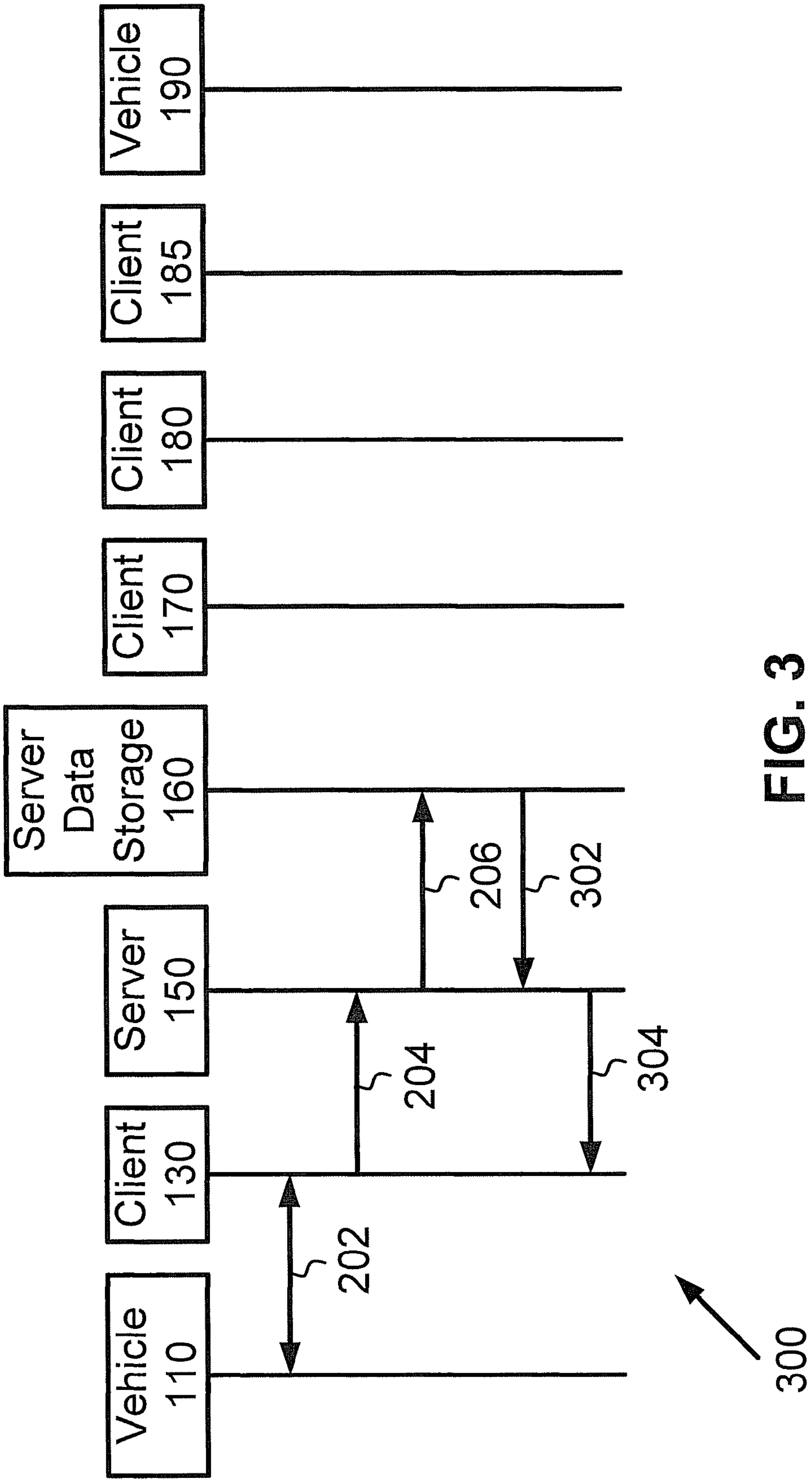
FIG. 3 is a diagram illustrating another example message flow.

Next, FIG. 3 is a diagram illustrating an example message flow 300 that may be carried out by system 100. For purposes of example only, message flow 300 is described with respect to crankshaft position (CKP) sensor data, but a person having ordinary skill in the art will understand that message flow 300 is applicable to other types of vehicle data that can be captured from a vehicle.

Message flow 300 may be carried out for situations in which server data storage 160 contains CVD requested by client 130 at the time server data storage 160 receives the data request. In those situations, server 150 does not have to send out any data-request messages to the other clients in order to obtain data after receiving the data-request message 204 in order to provide client 130 with the requested CVD. Message flow 300 includes client/vehicle messages 202, data-request message 204, and data-search request message 206, all of which are described above with respect to FIG. 2.

Message 302 is a requested-data message that server data storage 160 transmits to server 150 so as to provide server 150 with data requested via data-request message 204 in message flow 300. Server data storage 160 may transmit requested-data message 302 via network 140 or via system bus 610. In accordance with either of those cases, requested-data message 302 may comprise any of the following data fields that are contained within requested-data message 800: (i) request ID 830 field comprising the request ID in data-request message 204 in message flow 300, (ii) data tag field 840 comprising data tags associated with CVD within CVD field 850, and (iii) CVD field 850 comprising data captured from a vehicle prior to client 130 requesting the data from server 150 via data-request message 204. In accordance with the case in which requested-data message 302 is transmitted via network 140, requested-data message 302 may further comprise destination ID field 810 including a unique address of server 150, and source ID field 820 including a unique address of server data storage 160. Requested-data message 302 may comprise one or more messages, as necessary, to deliver the requested CVD (e.g., CKP sensor data).

Message 304 is a requested-data message that server 150 transmits to client 130 so as to provide client 130 with CVD requested via data-request message 204 in message flow 300. Requested-data message 304 may be arranged as requested-data message 800. In that regard, for example, requested-data message 304 may comprise (i) destination ID field 810 comprising a unique address associated with client 130, (ii) source ID field 820 comprising a unique address associated with server 150, (iii) request ID field 830 comprising the same request ID included within data-request message 204 in message flow 300, (iv) data tags field 840 comprising data tags associated with the CVD contained within CVD field 850, and (v) CVD field 850 comprising CVD that was captured from a vehicle prior to client 130 requesting the data from server 150 via data-request message 204. Upon receiving requested-data message 304, client 130 can present the CVD via a user interface as described below with respect to FIG. 5. Message 304 may comprise one or more messages, as necessary, to deliver the requested CVD (e.g., CKP sensor data).

Figure 4:
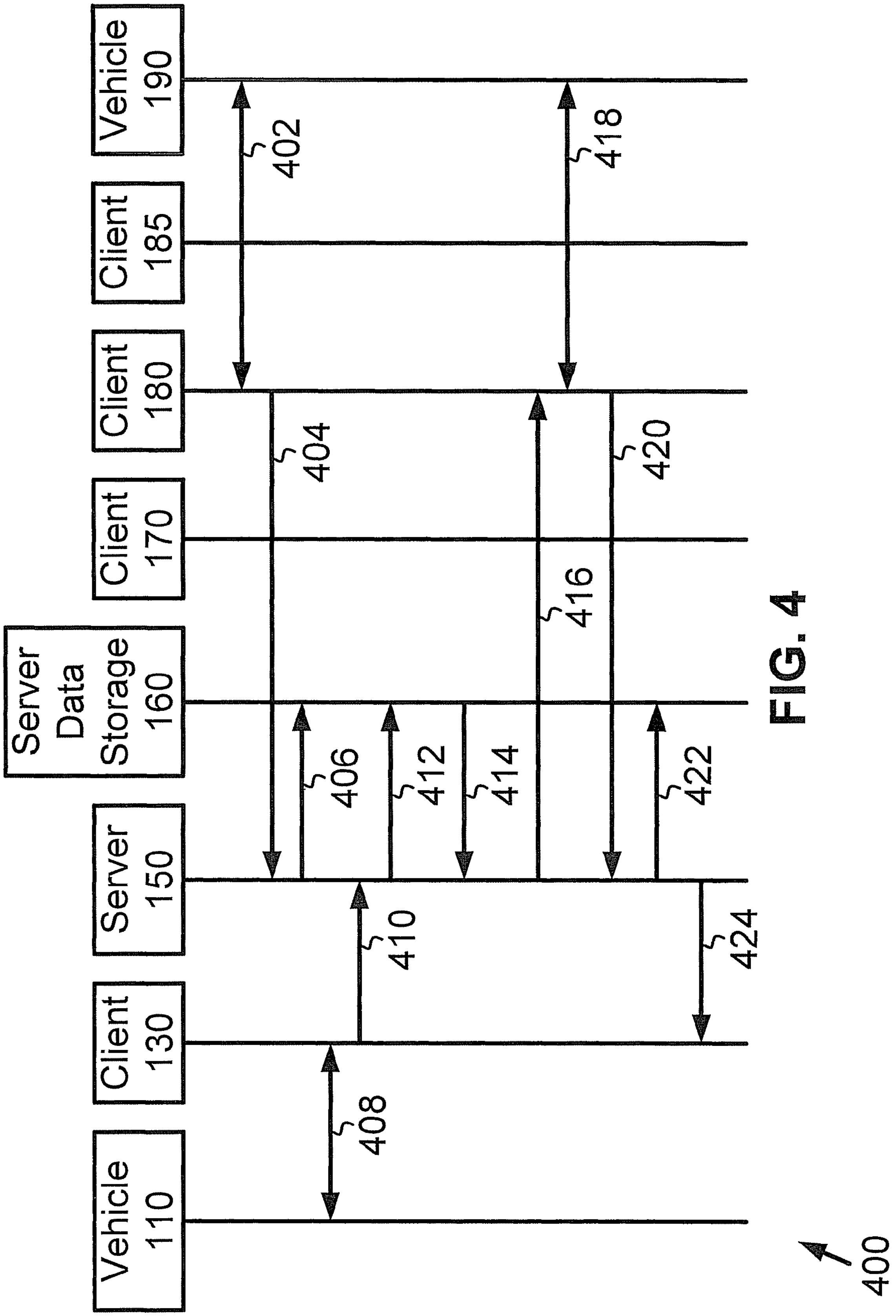
FIG. 4 is a diagram illustrating another example message flow.

Next, FIG. 4 is a diagram illustrating an example message flow 400 that may be carried out by system 100. For purposes of example only, message flow 400 is described with respect to crankshaft position (CKP) sensor data, but a person having ordinary skill in the art will understand that message flow 400 is applicable to other types of vehicle data that can be captured from a vehicle. A sequence of messages using at least some of the messages of message flow 400 may be carried out for a situation in which client 180 notifies server 150 that client 180 is connected to vehicle 190 prior to client 130 requesting data from server 150, and prior to server 150 receiving CVD from client 180 to fulfill that request for data from client 130.

Messages 402 are client/vehicle messages comprising one or more messages that client 180 transmits to vehicle 190 and/or one or more messages that vehicle 190 transmits to client 180. Messages 402 may include messages that client 180 transmits to request vehicle data from vehicle 190. Messages 402 may include messages that client 180 receives from vehicle 190 to receive vehicle data requested from vehicle 190, such as data to determine the vehicle-type of vehicle 190. The vehicle data requested via messages 402 may or may not include CVD that is provided to client 130 via requested-data message 424 described below.

Message 404 is a status message transmitted by client 180 to server 150. Status message 404 may include one or more message fields shown in data-request message 700. For example, status message 404 may include (i) a destination ID that identifies a unique address associated with server 150, (ii) a source ID field that identifies a unique address associated with client 180, and (iii) a data tags field comprising a VIN tag 1018 to identify a vehicle ID tag (e.g., a VIN) associated with vehicle 190, and Client Settings tag 1014 that identify client setting for configuring client 180 for capturing vehicle data from vehicle 190. Furthermore, status message 404 may include a request ID field that indicates No_Request. Server 150 may be arranged to interpret the No_Request indication as an indication that client 180 is an active client not requesting any CVD.

Message 406 is data storage request message that server 150 transmits to server data storage 160. In accordance with message flow 400, message 406 comprises data that server 150 received from client 180 via status message 404. As an example, server 150 may transmit message 406 via network 140 or system bus 610. Client register 620 may be modified with status data received via message 604 if the status data differs from status data associated with client 180 currently stored in client register 620

Messages 408 are client/vehicle messages comprising one or more messages that client 130 transmits to vehicle 110 and/or one or more messages that vehicle 110 transmits to client 130. Messages 408 may include messages that client 130 transmits to request data (e.g., CKP sensor data) from vehicle 110. Messages 408 may include messages that client 130 receives from vehicle 110 to receive data requested from vehicle 110, such as CKP sensor data and data to determine the vehicle-type of vehicle 110. Messages 408 may be similar to client/vehicle messages 202 described above.

Message 410 is a data-request message that client 130 transmits to server 150 via network 140. Data-request message 410 may be arranged as data-request message 700 and/or as data-request message 204, which are described elsewhere herein.

Message 412 is a data-search request message that server 150 transmits to server data storage 160. Data-search request message 412 may be arranged as data-search request message 206, which is described above and is illustrated in FIG. 2. In response to receiving data-search request message 412, server 150 may execute program instructions to carry out a search of a client register 620 so as to determine whether any active client is communicatively coupled to a vehicle from which that active client can capture vehicle data requested via data-request message 410.

Message 414 is a data-search request response message that server data storage 160 transmits to server 150. In accordance with message flow 400, at least one active client is communicatively coupled to a vehicle from which the at least one active client can capture the requested vehicle data. Accordingly, message 414 provides server 150 with data that indicates which active client(s) are so communicatively coupled to a vehicle. Table 1 below illustrates a list of active clients identified within client register 620.

Message 416 is a data-request message that server 150 transmits to client 180. Server 150 may transmit data-request message 416 in response to server 150 receiving data-search response message 414 with data that indicates client 180 is an active client communicatively coupled to a vehicle from which client 180 can capture data for fulfilling data-request message 410. In the event that data-search response message 414 identifies that multiple active clients are communicatively coupled to respective vehicles from which those active clients can capture vehicle data for fulfilling data-request message 410, server 150 may broadcast (e.g., transmit) a respective data-request message to each of those clients in a manner similar to server transmitting data-request messages 210A, 210B, and 210C.

Message 418 represents a data capture event carried out by client 180 to capture CVD comprising CKP sensor data. For purposes of this description, message 418 is also referred to as data capture event 418. In one respect, the capture of vehicle data during data capture event 418 may be carried out via an encoded message request. For instance, data capture event 418 may include client 180 transmitting one or more messages to vehicle 190 to request vehicle data, and vehicle 190 transmitting one or more messages to client 180 with the requested vehicle data. Client 180 captures the requested vehicle data sent to client 180 from vehicle 190. In another respect, the capture of vehicle data during data capture event 418 may be carried out as a non-encoded message request as described below with respect to a vehicle interface 506 shown in FIG. 5.

Message 420 is a requested-data message that client 180 transmits to server 150 so as to provide server 150 with data requested via data-request message 410. Requested-data message 420 may be arranged as requested-data message 800. In that regard, for example, requested-data message 410 comprises (i) a destination ID field 810 that indicates a unique address associated with server 150, (ii) a source ID field 820 that indicates a unique address associated with client 180, (iii) a request ID field 830 that is the same as the request ID in data-request message 410, (iv) a data tags field 840 that comprises data tags that client 180 associated with requested data that client 180 captured from vehicle 190 in response to data-request message 410, and (v) a CVD field 850 that comprises data that client 180 captured from vehicle 190 in response to data-request message 410.

Message 422 is data storage request message that server 150 transmits to server data storage 160. In accordance with message flow 400, message 422 comprises CVD that server 150 received from client 180 via requested-data message 420. The CVD within data storage request message 422 may be associated with one or more data tags that server 150 or client 180 assigned to the CVD. The CVD within data storage request message 422 may include CVD that client 180 captured from vehicle 190 in response to data-request message 410.

Message 424 is a requested-data message that server 150 transmits to client 130 so as to provide client 130 with data requested via data-request message 410. Requested-data message 424 may be arranged as requested-data message 800. In that regard, for example, requested-data message 424 may comprise (i) a destination ID field 810 that indicates a unique address associated with client 130, (ii) a source ID field 820 that indicates a unique address associated with server 150, (iii) a request ID field 830 that is the same as a request ID field in data-request messages 410 and 416, (iv) a data tags field 840 that comprises data tags that client 180 associated with requested data that client 180 captured from vehicle 190 in response to data-request message 416, and (vi) a CVD field 850 that comprises data that client 180 captured from vehicle 190 in response to data-request message 416.

Figure 7:
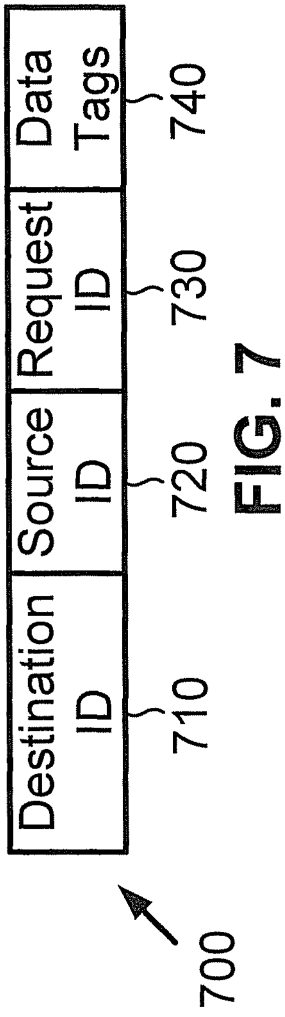
FIG. 7 is a diagram illustrating an example message that can be communicated within the system illustrated in FIG. 1.

Next, FIG. 7, FIG. 8, and FIG. 9 illustrate example messages with multiple message fields in accordance with the example embodiments described herein. A person having ordinary skill in the art will understand that the various fields of the example messages may be arranged in various sequences, and that same person will also understand that the data within two or more of the various fields of each message may be combined into a single message field, and that any of the example messages may include additional fields (not shown) such as headers, checksums, or some other type of message field.

FIG. 7 illustrates an example data-request message 700 that comprises the following fields: a destination identifier (ID) field 710, a source ID field 720, a Request ID field 730, and a data tags field 740. Destination ID field 710 identifies a destination (e.g., server 150) for data-request message 700, whereas source ID field 720 identifies a source (e.g., client 130) of that message. By way of example, destination ID field 710 may comprise a unique address (e.g., an IP address or an IP address and UDP port) of the message destination and source ID field 720 may comprise a unique address (e.g., an IP address or an IP address and UDP port) of the message source. Other examples of unique addresses that identify a message destination or a message source, such as Uniform Resource Locators (URL) a mobile identification numbers (MIN), or a Bluetooth protocol pairing ID, are also possible.

Request ID field 730 may comprise a request ID that identifies a unique ID that client 130 and server 150 can use to determine that CVD is associated with a data request of a given data-request message. The request ID may be determined by a client that sends the data-request message or by the server that receives the data-request message. In the latter case, the server may respond to the data-request message with a message that identifies the request ID. Request ID field 730 may comprise a numeric identifier or some other identifier to uniquely identify each separate data request from a client. As an example, the request ID of request ID field 730 may be a number such as 000999.

Data tags field 740 comprises a variety of data tags. The data tags may pertain to a client that is requesting data, a vehicle-type of a vehicle that is communicatively coupled to the client that is requesting data, the type of data being requested, environmental conditions surrounding the client that is requesting data, or to some other aspect of system 100. As an example, data tags field 740 may comprise one or more data tags of data tags 1010.

FIG. 8 illustrates an example requested-data message 800 that comprises the following fields: a client ID field 810, a server ID field 820, a request ID field 830, a data tags field 840, and a CVD field 850. Destination ID field 810 identifies a destination (e.g., server 150) for data-request message 800, whereas source ID field 820 identifies a source (e.g., client 130) of that message. By way of example, destination ID field 810 may comprise a unique address (e.g., an IP address or an IP address and UDP port) of the message destination and source ID field 820 may comprise a unique address (e.g., an IP address or an IP address and UDP port) of the message source. Request ID field 830 may comprise a numeric identifier or some other identifier as defined above with regard to Request ID field 730. Data tags field 840 may comprise one or more data tags as defined above with regard to data tags field 740. CVD field 850 comprises vehicle data captured by a client. The CVD placed into data field 850 may be from a local library at a client system or from a central library at a server system.

FIG. 9 illustrates an example data-request cancellation message 900 that comprises the following fields: a destination ID field 910, a source ID field 920, a request ID 930, and a cancel command field 940 to notify clients that a response to previously-sent data request is no longer requested or desired. Destination ID field 910 may be arranged as destination ID field 810 (shown in FIG. 8). Source ID field 920 may be arranged as source ID field 820 (shown in FIG. 8). Request ID field 930 may be arranged as request ID field 830 (shown in FIG. 8). As an example, server 150 may transmit data-request cancellation message 900 with request ID field 930 being 000999 so as to notify clients that a response to that request is no longer requested or desired. Data-request cancellation messages 218A, 218B, and 218C (shown in FIG. 2) may be arranged like data-request cancellation message 900, although destination ID field 910 for each of messages 218A, 218B, and 218C would typically comprise the respective unique address for the destination of those messages.

Figure 5:
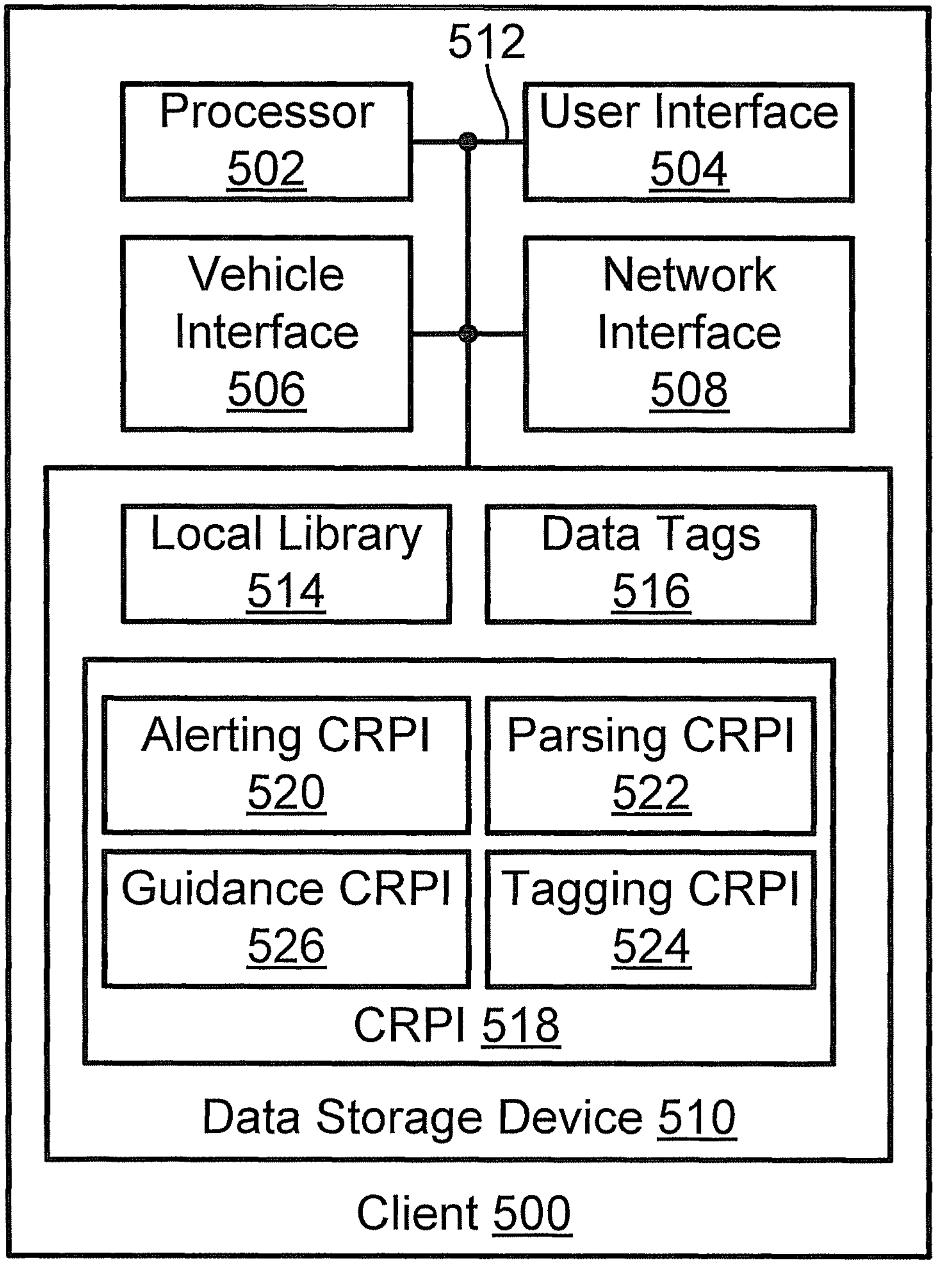
FIG. 5 is a block diagram of a client system in accordance with an example embodiment.
Figure 14:
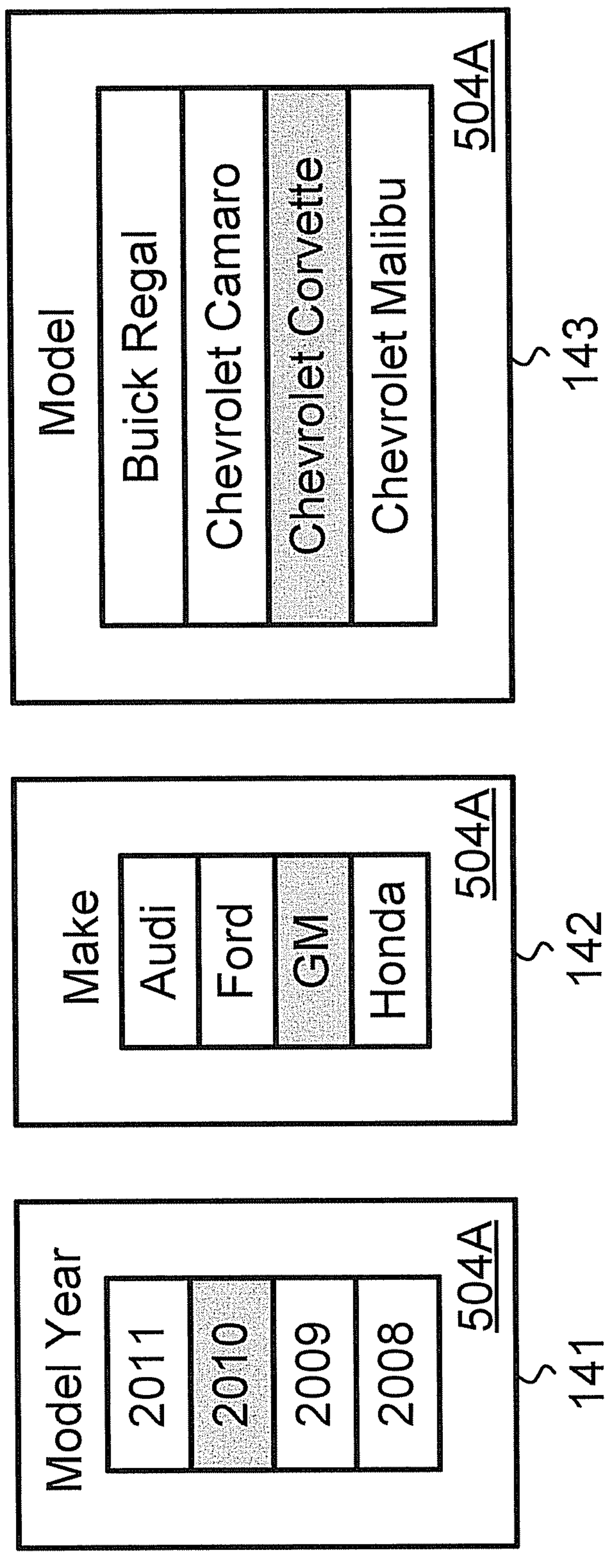
FIG. 14 illustrates example selection screens displayable via a client system.
Figure 15:
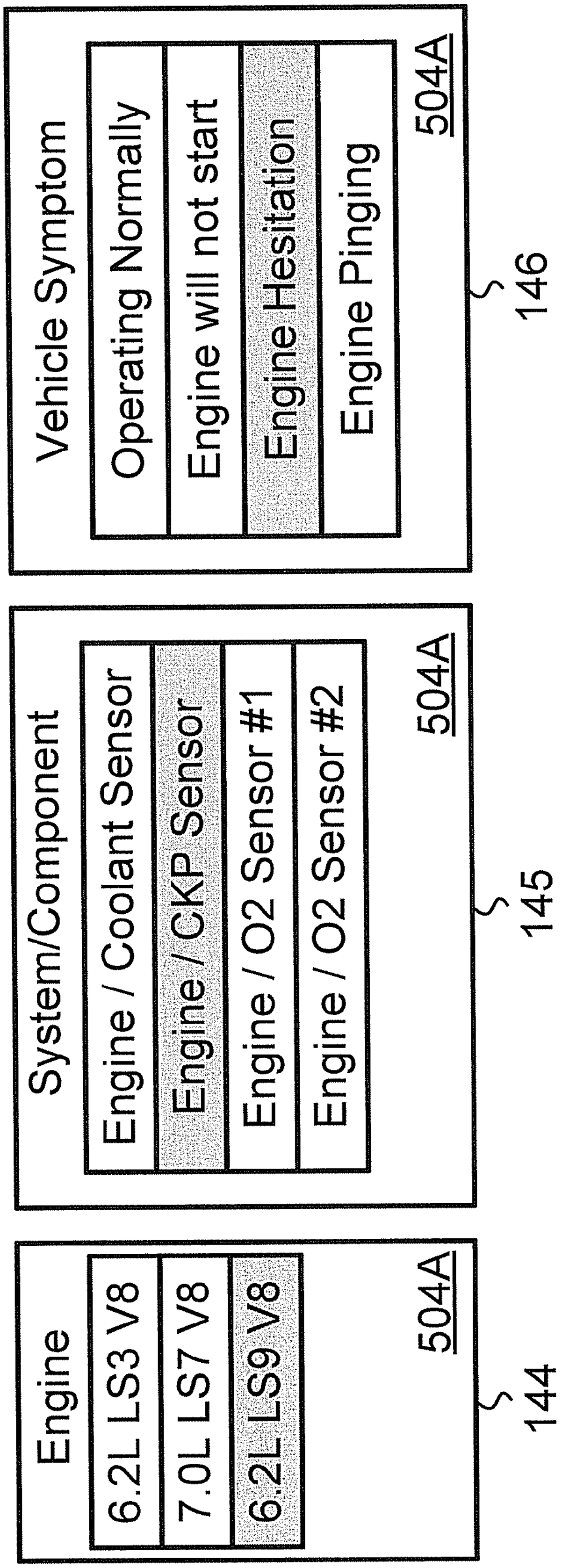
FIG. 15 illustrates example selection screens displayable via a client system.
Figure 16:
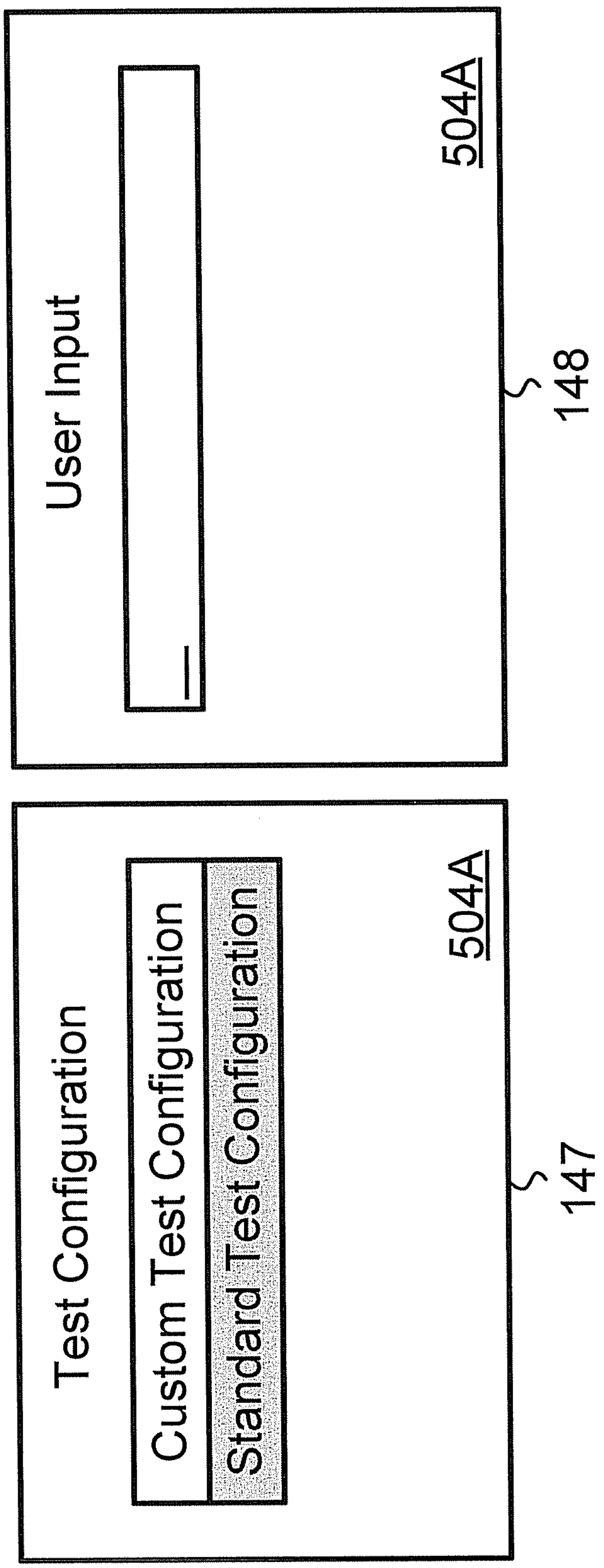
FIG. 16 illustrates example selection screens displayable via a client system.

FIG. 14, FIG. 15, and FIG. 16 illustrate example selection screens 141, 142, 143, 144, 145, 146, 147, and 148 displayable on a display device 504A of a client 500 (shown in FIG. 5). Each of the selection screens displays data that, upon being selected via a user interface 504, may be used in the generation of data-request message 700, and in particular, data tags for including in data tags field 740. The shaded boxes within FIG. 14 to FIG. 16 represent data selected via that selection screen. The data selectable via the selection screens of increasing numbers may depend upon data selected via lower numbered selection screens. For example, the vehicle models selectable via selection screen 143 may only include vehicle models made by General Motors (GM) selected via selection screen 142 for the model year 2010 selected via selection screen 141. Selection screen 148 illustrates a cursor at which text may be entered for storing as a User Input tag 1036 (shown in FIG. 10).

Selection screen 147 allows for selecting a custom test configuration or a standard test configuration. The custom test configuration may be subsequently defined, at least in part, via additional selection screens (not shown) to select settings of the client, such as a volts per division setting and a time per division setting. Additionally or alternatively, the custom test configuration may be defined, at least in part, based on the current settings of client 500, such as the settings shown for Client Setting tag 1014 (shown in FIG. 10). In response to receiving a data-request message with a selection of custom test configuration, server 600 may responsively (i) search central library 622 to determine whether it contains the CVD requested by the data-request message, and (ii) request CVD according to the custom test configuration and thereafter transmit the requested CVD to the client, and/or transmit to the client a response message that indicates it does not have the requested CVD. That response message may further indicate the central library 622 contains alternative CVD that might interest the user, such as CKP sensor data for the same type of vehicle, except that the CVD was captured using an alternative test configuration, such as the standard test configuration.

Selection of the standard test configuration may result in client 500 receiving more CVD than if the custom test configuration is selected because less CVD or no CVD may have been previously captured using the custom test configuration. Unless the custom test configuration is selected, server 150 may be arranged to transmit data-request messages with data fields that identify the standard test configuration so that all clients receiving the data-request message and being used to capture the vehicle data can be configured to capture the vehicle data using the same test configuration. That typically leads to capturing vehicle data that can be more meaningfully compared with other captured vehicle data using the same test configuration.

III. Example Architecture

FIG. 5 is a block diagram of an example client system (or vehicle-diagnostic client system, or more simply, client) 500. The block diagram of FIG. 5, as well as the other block diagram(s), message flow diagrams, and flow charts accompanying this description, are provided merely as examples and are not intended to be limiting. Many of the elements illustrated in the figures and/or described herein are functional elements that may be implemented as discrete or distributed components or in conjunction with other components, and in any suitable combination and location. Those skilled in the art will appreciate that other arrangements and elements (for example, machines, interfaces, functions, orders, and groupings of functions, etc.) can be used instead. Furthermore, various functions described as being performed by one or more elements can be carried out by a processor executing computer-readable program instructions and/or by any combination of hardware, firmware, and software.

Client 500 is operable for capturing vehicle data, providing CVD to a server, receiving vehicle data captured by another client system, storing vehicle data captured by client 500 or by another client, and presenting CVD to a user of client 500. Those functions, as well as other functions carried out by client 500, allow client 500 to be used for diagnosing vehicles. Client 500 includes a processor 502, a user interface 504, a vehicle interface 506, a network interface 508, and a data storage device 510, all of which may be linked together via a system bus, network, or other connection mechanism 512. Clients 130, 170, 180, and 185 may be configured as client 500 is configured.

Processor 502 may comprise one or more general purpose processors (for example, INTEL single core microprocessors or INTEL multicore microprocessors) and/or one or more special purpose processors (for example, digital signal processors). Processor 502 is operable to execute computer-readable program instructions, such as computer-readable program instructions (CRPI) 518.

User interface 504 is adapted for presenting data to users audibly, visually, and/or haptically. The audible presentation of data may be carried out via one or more loud speakers at client 500. The visual presentation of data may be carried out via one or more display devices (e.g., a liquid crystal display (LCD), a light emitting diode (LED) display, or a plasma display) at client 500. The haptic presentation of data may be carried out via one or more motors at client 500. Examples of data presentable via user interface 504 include (i) client setup data for manually configuring client 500 in a particular data capture mode, (ii) vehicle data captured via vehicle interface 506 (e.g., waveform 1000 shown in FIG. 10), (iii) vehicle data received via network interface 508 (e.g., waveform 1100 shown in FIG. 11), (iv) data tags associated with CVD (e.g., data tags 1010 and 1110 shown in FIG. 10 and FIG. 11), (v) data-request alerts described elsewhere herein, (vi) data tags associated with CVD, and (vii) a requested-data cancellation alert.

User interface 504 is also adapted for a user to input data into client 500. User interface 504 may, for example, receive audible input data (e.g., data a user enters via a microphone and associated electronic circuitry), visible light data (e.g., data a user enters via an image capture device), or user touch input data (e.g., data a user enters via a keypad or keyboard). Examples of the input data that can be entered via user interface 504 include (i) data to select a particular data capture mode of client 500, (ii) user input tags to be associated with CVD (e.g., user input tags 1036), (iii) a request to search local library 514 for locally stored data that is associated with a set of one or more data tags entered via the request, and (iv) a request to receive from network 140 data captured via another client operating within a community of clients. User input 504 may include a digital camera for capturing digital photographs of a vehicle or some portion of a vehicle.

Vehicle interface 506 provides means for client 500 to capture data from a vehicle. The CVD may include vehicle diagnostic data, such as On-Board Diagnostics II (OBD II) diagnostic data comprised in an encoded diagnostic message, analog signals (e.g., voltage or current signals) displayable as an oscilloscope waveform or as numeric values, or some other type of vehicle diagnostic data. Those digital photographs may be sent as CVD in CVD field 850.

Vehicle interface 506 may, for example, include (i) a first connector adapted to be connected to a wiring harness, and (ii) a wiring harness including one or more wires, a second connector adapted to connect to the first connector, and a third connector adapted for connecting to a vehicle. As an example, the third connector of vehicle interface 506 may include a data link connector arranged in conformance with a version of the Society of Automotive Engineers (SAE) J-1962 specification. As another example, the third connector may be a clamp such an alligator clamp, a pointed probe such as a probe typically found on digital volt-ohm meter (DVOM) leads, an inductive probe such as a probe typically used with a current meter, or some other type of connector commonly used with a DVOM. These latter examples are examples of connectors for capturing vehicle data other than from non-encoded messages.

Additionally or alternatively, vehicle interface 506 may comprise a wireless interface for communicating with a vehicle over an air interface. In that regard, the vehicle may have a vehicle interface for communicating with client 500 over the same air interface. As an example, the air interface may carry out communications in accordance with an Institute of Electrical and Electronics Engineers (IEEE) 802.11 standard for Wireless Local Area Networks, an IEEE 802.15 standard for Wireless Personal Area Network (PAN) (e.g., a Bluetooth network), an IEEE 802.16 standard for Broadband Wireless Access, or some other standard.

Network interface 508 is adapted for client 500 to transmit and receive communications via network 140. Network interface 508 may comprise a wireless network interface that carries out communication over an air interface using a standard described above or some air interface standard, a wired network interface, or a hybrid network interface comprising both a wireless and wired network interface. Network interface 508 may comprise a network interface card, such an Ethernet interface card, or a wireless network card, such as a WiFi network card.

The communications transmitted by network interface 508 may include requests for CVD captured by another client, CVD captured by client 500, data tags associated with CVD captured by client 500, request alerts destined for remote alert device 175, or some other type of communication. The communications received by network interface 508 may include requests for client 500 to capture vehicle data, data tags associated with the requested CVD, CVD captured by another client, request alerts from server 150, or some other type of communication.

Data storage device 510 may comprise a non-transitory computer-readable storage medium readable by processor 502. The computer-readable storage medium may comprise volatile and/or non-volatile storage components, such as optical, magnetic, organic or other memory or disc storage, which can be integrated in whole or in part with processor 502. FIG. 5 illustrates that data storage device 510 contains a local library 514, data tags 516, and computer-readable program instructions (CRPI) 518 including alerting CRPI 520, parsing CRPI 522, tagging CRPI 524, and guidance CRPI 526.

Local library 514 contains local vehicle data that can be retrieved from data storage device 510. As an example, the local vehicle data (e.g., CKP sensor data) contained at local library 514 may comprise CVD captured via vehicle interface 506 and/or CVD received via network interface 508 from server 150. Local library 514 may comprise data tags associated with the local vehicle data. Alternatively, local library 514 may comprise pointers that are associated with the local vehicle data and that point to data tags within data tags 516.

Alerting CRPI 520 comprise program instructions that are executable to cause user interface 504 to present alerts, such as a data-request alert. Processor 502 may execute alerting CRPI 520 in response to client 500 receiving a data-request message, such as data-request message 210B, 416 or 800, via network interface 508. A data-request alert presented by user interface 504 may comprise an audible, visual, or haptic alert or some combination of those alerts.

Additionally or alternatively, alerting CRPI 520 may comprise program instructions that are executable to cause network interface 508 to transmit a data-request alert to at least one remote alert device 175. Those particular program instructions may be executed in response to network interface 508 receiving a data-request message and/or a data-request alert from server 150, and such instructions may be executed if a response to the data-request message or the data-request alert is not transmitted from client 500. Data storage device 510 may comprise destination data (e.g., a mobile identification number (MIN), e-mail address, or IP address) associated with each remote alert device 175 to which network interface 508 transmits data-request alerts.

Parsing CRPI 522 comprise program instructions that are executable to receive vehicle data from a vehicle via vehicle interface 506 and to parse (e.g., extract) from the received vehicle data a particular subset of the received data (e.g., CKP sensor data). In this regard, the received vehicle data may comprise an encoded message that comprises the CKP sensor data. A given vehicle data standard (e.g., SAE standard J1979) may define that the particular subset of data is located at a particular position of the encoded message, and parsing CRPI 522 may be configured to extract the CKP sensor data from that particular portion of the encoded message.

Tagging CRPI 524 comprise program instructions that are executable to associate one or more data tags 516 with the CVD captured by client 500, captured typically by vehicle interface 506, but possibly by user interface 504 or network interface 508 as well. Each of the one or more tags 516 comprises metadata (e.g., data about other data). In general, data tags 516 may include data tags regarding client settings of client 500, data tags regarding the vehicle-type of the vehicle from which the vehicle data was captured, data tags regarding vehicle operating conditions at the time the vehicle data was captured, and data tags related to miscellaneous information such as the time and date of the data capture, climate conditions (e.g., ambient temperature or barometric pressure) at the location of the data capture. The data tags associated with each set of CVD may be stored as a distinct file (e.g., an XML file or some other type of file) or in some other manner known for storing data within a data storage device. Data tags 1010 illustrate an example of the data tags that may be associated with CVD.

CRPI 518 may comprise other program instructions as well. As an example, CRPI 518 may comprise program instructions that are executable to locate CVD stored within local library 514. Processor 502 may execute those program instructions in response to receiving a data-request message via network interface 508, or a request for data via user interface 504.

As another example, CRPI 518 may comprise program instructions executable to cause network interface 508 to transmit any of the messages in message flows 200, 300, and 400 shown as being transmitted by a client.

As yet another example, CRPI 518 may comprise program instructions that are executable to cause vehicle interface 506 to configure itself for capturing vehicle data in response client 500 receiving a data-request message. The client configuration may be defined via Client Setting tag 1014 in data tags field 740 in data-request message 700. Execution of the foregoing program instructions to configure the client for capturing vehicle data is beneficial in that the client can be configured in a configuration identical to a configuration used by another client to capture CVD that will be compared with CVD captured by client 500.

As still yet another example, CRPI 518 may comprise program instructions that are executable to cause user interface 504 to present instructions for additional client configuration (e.g., present instructions to connect a first vehicle capture probe to a first vehicle interface connection and to a first location on the vehicle). Execution of the foregoing program instructions may occur for client settings of a client that cannot be automatically configured.

As still yet another example, CRPI 518 may comprise program instructions that cause user interface 504 to present setup means (e.g., graphical displays) for setting up the client to receive particular data-request alerts. For instance, if client 130 is and/or will be operated by a user that works at a factory-authorized dealership (e.g., a dealership authorized by the Honda Motor Company, Incorporated (or more simply "Honda"), the user may want client 130 to receive data-request alerts for data retrievable only from vehicles manufactured by Honda. The setup means may allow the user to select Honda from a list of displayed automobile manufacturers. The setup means may allow the user to select another vehicle manufacturer in addition to Honda (e.g., if the user works at a dealership authorized by multiple manufacturers) or to replace Honda with a different selected vehicle manufacturer (e.g., if the user stops working at the Honda dealership and begins working at another dealership authorized by a vehicle manufacturer other than Honda).

Additionally, the CRPI 518 may be executable such that the setup means allows the user to select the type of vehicle system(s) for which the user approves of receiving data-request alerts. For instance, the approved systems could include, but are not limited to, engine systems and supplemental inflatable restraint systems, whereas the systems not approved by the user but selectable via the setup means may, for example, include anti-lock brake systems and audio systems. The setup means may also allow the user to opt out of receiving any data-request alerts from server 600 until such time that the user or another user opts in to receiving data-request alerts from server 600.

Furthermore, the data identifying vehicle manufacturers, vehicle systems, or any other characteristics available for selecting via the setup means may be modified such that the data selectable via the setup means does not have be a fixed set of data. Server 150 may transmit the data for modifying the data selectable via the setup means (e.g., new vehicle models introduced by a manufacturer or a new vehicle manufacturer). Furthermore still, the setup means may be arranged such that a user is not restricted to the type of data-request alerts that user will receive. For example, a user of client 500 that works at a Honda dealer may receive data-request alerts for vehicles manufactured by Honda, but is not restricted to receiving data-request alerts only for vehicles manufactured by Honda.

Figure 6:
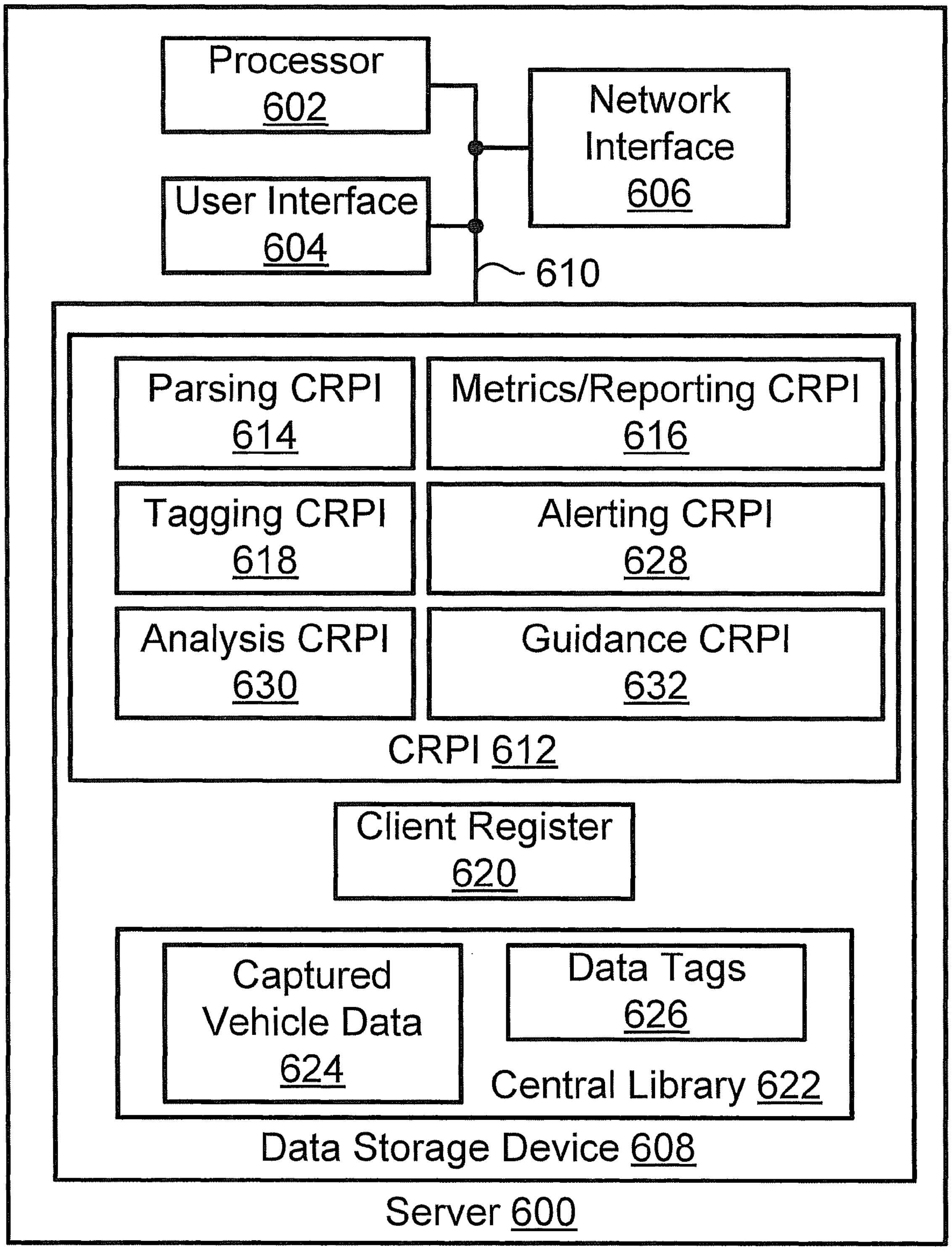
FIG. 6 is a block diagram of a server system in accordance with an example embodiment.

Next, FIG. 6 is block diagram of an example server system (or a vehicle-diagnostic server system, or more simply, server) 600. Server 600 includes a processor 602, a user interface 604, a network interface 606, and a data storage device 608, all of which may be linked together via a system bus, network, or other connection mechanism 610. Server 150 may be configured as server 600 is configured.

Processor 602 may comprise one or more general purpose processors (for example, INTEL single core microprocessors or INTEL multicore microprocessors) and/or one or more special purpose processors (for example, digital signal processors). Processor 602 is operable to execute computer-readable program instructions, such as computer-readable program instructions (CRPI) 612.

User interface 604 is operable to present data to users audibly, visually, and/or haptically, and is also adapted for a user to input data into server 600. As an example, user interface 604 may present reports and metrics determined by metrics/reporting CRPI 616. The data input via user interface 604 may comprise data tags that tagging CRPI 618 associate with vehicle data received via network interface 606. The data tags entered via user interface 604 may supplement other data tags that tagging CRPI 618 associates with CVD.

Network interface 606 is operable for client 600 to transmit and receive communications via network 140. Network interface 606 may comprise a wireless network interface that carries out communication over an air interface using a standard described above or some air interface standard, a wired network interface, or a hybrid network interface comprising both a wireless and wired network interface. Network interface 606 may comprise a network interface card, such an Ethernet interface card, or a wireless network card, such as a WiFi network card.

Data storage device 608 may comprise a non-transitory computer-readable storage medium readable by processor 602. The computer-readable storage medium may comprise volatile and/or non-volatile storage components, such as optical, magnetic, organic or other memory or disc storage, which can be integrated in whole or in part with processor 602. FIG. 6 illustrates that data storage device 608 comprises (i) computer-readable program instructions (CRPI) 612 including parsing CRPI 614, metrics/reporting CRPI 616, tagging CRPI 618, alerting CRPI 628, analysis CRPI 630, and guidance CRPI 632, (ii) a client register 620, and (iii) a central library 622.

Parsing CRPI 614 are executable to parse (e.g., extract) a portion of CVD received at network interface 606 from a client. Processor 602 may execute parsing CRPI 614 in response to receiving CVD that includes data not specifically requested via a data-request message and/or data that is not required for responding to a data-request message. For example, network interface 606 may receive a stream of multiple messages that include data that a client captures from a vehicle electronic control unit (ECU), the data including CKP sensor data and throttle position sensor data. In accordance with a case in which server 600 received a data-request message for CKP sensor data, processor 602 may execute parsing CRPI 614 to parse (e.g., extract) the CKP sensor data from the stream of multiple messages for storage of the parsed CKP sensor data for storage at central library 622.

Metrics/reporting CRPI 616 are executable to generate various reports, such as reports pertaining to use of server 600, reports pertaining to remaining capacity of data storage device 608, the types of data and/or tags stored in data storage device 608, or some other reports. The generated reports may include any of a variety of metrics for analyzing use of server 600. The reports may include graphical representations (e.g., a data dashboard) of the data and/or tags stored in data storage device.

Figure 11:
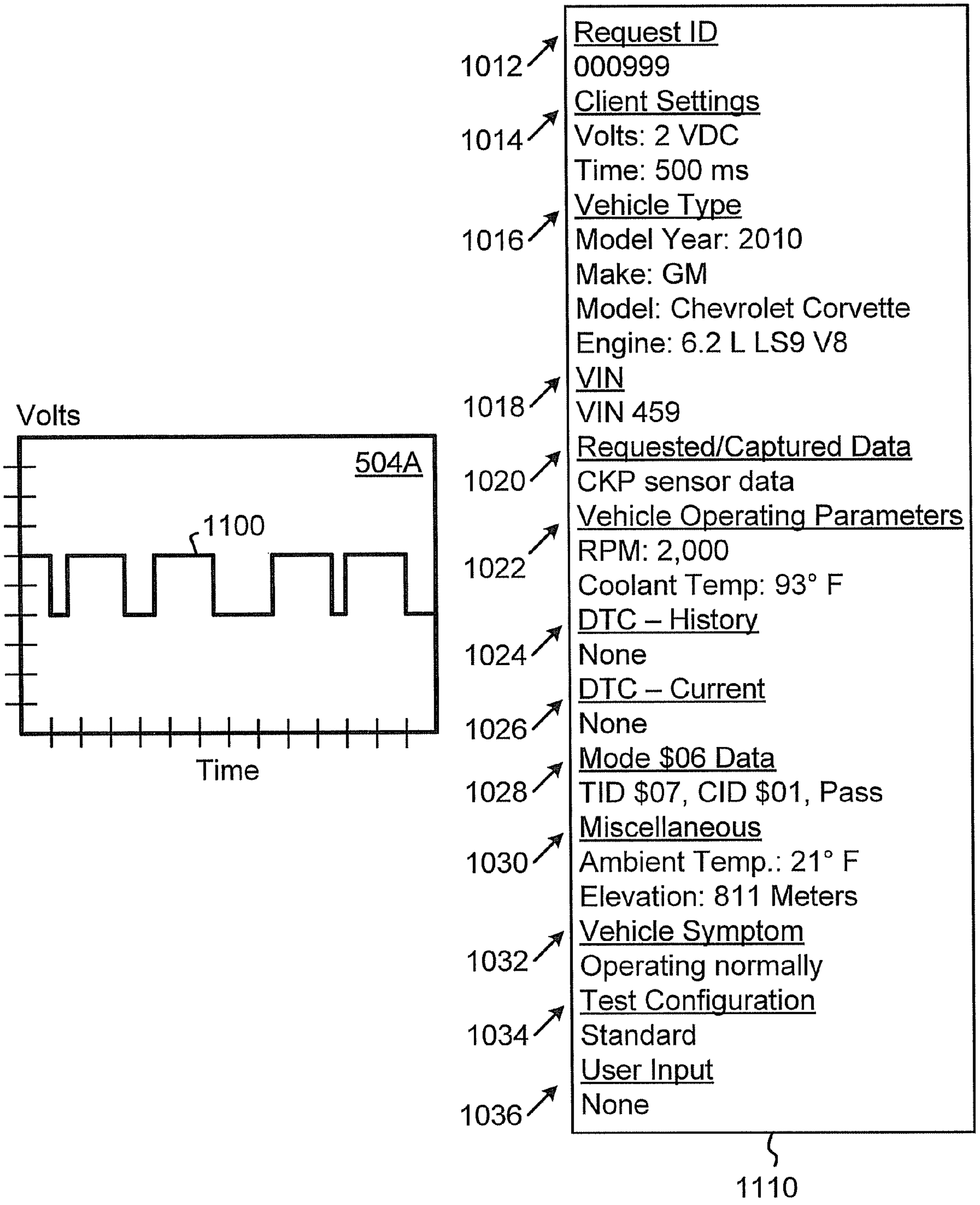
FIG. 11 illustrates another example of vehicle data captured by a client and data tags associated with the captured vehicle data.

Tagging CRPI 618 are executable to associate one or more data tags with CVD that is stored or is to be stored in central library 622. Executing tagging CRPI 618 may include converting data tags in a first form (e.g., data tags encoded in a message (e.g., requested-data message 800) according to a data map) to data tags in a second form (e.g., data tags in a file such as an XML file). The data tags in the first form may have been associated with the CVD by processor 502 executing tagging CRPI 524. Example data tags that tagging CRPI 618 may associate with CVD are illustrated in FIG. 10 and FIG. 11.

Alerting CRPI 628 are executable to cause network interface 606 to transmit alerts to network 140 for transmission, in turn, to clients and/or remote alert device (e.g., remote alert device 175).

As an example, if a data-request alert is to be sent to client 185, but client 185 is not an active client (as identified in Table 1 below), alerting CRPI 628 may be executed to cause network interface 606 to transmit a power-on-request alert to one or more remote alert devices associated with client 185. As identified in Table 1, a remote alert ID associated with client 185 is MIN-4 and the type of alert is a text message. Accordingly, alerting CRPI 628 may cause network interface 606 to transmit the power-on-request alert within a text message to a mobile telephone associated with MIN-4. As an example, the power-on-request alert may comprise a text message that requests that client 185 become an active client. In response to receiving the power-on-request alert, a user may cause client 185 to transition from the off power state to the on power state and/or enable client 185 to connect to network 140 so that client 185 can transition from being an inactive client to being an active client. Once server 600 determines client 185 is an active client, alerting CRPI 628 may be executed to cause network interface 606 to send a data-request alert to network 140 for transmission, in turn, to client 185.

As another example, alerting CRPI 628 may cause an alert to be sent to a remote alert device if server 600 does not receive a response to a data-request alert sent to a client associated with the remote alert device. For example, alerting CRPI 628 may cause network interface 606 to transmit an alert to remote alert device 175 if client 130 does not respond, within a threshold amount of time, to a data-request alert sent to client 130. That alert may, for example, include text and/or symbols that notify a user that a data-request alert has been transmitted to client 130 so as to prompt the user to review the data-request alert and/or to respond to the data-request alert transmitted to client 130 or to respond to the alert sent to remote alert device 175. Server 600 may include data that identifies the threshold amount of time. The threshold amount of time may be fixed, adjustable for each individual client via individual threshold amounts of time, or adjustable for all clients via a single threshold amount of time.

As another example, execution of alerting CRPI 628 may cause a data-request alert to be sent to the client and an alert to be sent to a remote alert device associated with the client. Additionally, execution of alerting CRPI 628 may cause multiple alerts to be sent to the same or multiple remote alert devices associated with a client. For example, Table 1 identifies that client 130 is associated with a remote alert device with MIN-1 and is to be alerted via voice and text message alerts, and client 170 is associated with (i) a remote alert device with MIN-2 for receiving alerts via a text message, (ii) an e-mail address 1 for receiving alerts via a voice message.

CRPI 612 may comprise other program instructions as well. As an example, CRPI 612 may comprise program instructions that are executable to locate CVD stored within central library 622. Processor 602 may execute those program instructions in response to receiving a data-request message. As another example, CRPI 612 may comprise program instructions that are executable to cause network interface 606 to transmit any of the messages in message flows 200, 300, and 400 shown as being transmitted by server 150 or server data storage 160.

Client register 620 comprises data that identifies clients that have registered with server 150. Client register 620 may further comprise data that identifies whether a registered client is an active client (e.g., a client operating in a power on state and communicating via network 140). As an example, communicating via network 140 may comprise the client occasionally sending a status message via network 140 to notify other devices on network 140 that the client is accessible via network 140. As an example, transmission of status messages from a client may occur every X number of seconds while the client is operating in a power on state and communicating via network 140, where X is a number of seconds between 1 second and 1,800 second or between some other range of seconds or portions of seconds. Should server 600 not receive a status message from an active client within X number of seconds, server 600 may update client register 620 to indicate that the client is inactive. The status message sent by a client may include data tags that include a vehicle ID data tag that identifies a vehicle to which the client is connected and/or is in communication with.

Client register 620 may comprise a client ID for each registered client. Server 600 may use the client ID as a destination ID in a message (e.g., data-request message 800) that it transmits to the client identified by that destination ID. Client register 620 may comprise a vehicle-type ID for each registered active client that is communicatively coupled to a vehicle. The information in the vehicle-type IDs may comprise data that data server 150 receives in a status messages. Client register 620 may also comprise remote alert identifiers associated with each registered client.

Table 1 illustrates example data storable in client register 620. As shown in Table 1, the vehicle-type ID is arranged as a vehicle make identifier, a vehicle model identifier, a model year identifier, and an engine identifier. Those identifier are abbreviated as (M/M/Y/E) in Table 1. Those identifiers may be stored in any of a variety of manners. In Table 1, the vehicle make identifiers may be encoded numbers from 1 to 20, the vehicle model identifiers may be encoded letters of a given alphabet, the model year identifiers may be calendar year numbers, and the engine identifiers may be encoded numbers from 40 to 400. Other examples of storing vehicle-type identifiers are also possible. Furthermore, as shown in Table 1, the remote alert identifiers may comprise mobile identifier numbers (MIN) for sending voice calls or text messages to cellular phones associated with the MIN and e-mail addresses. A preferred alert mode (e.g., voice, text, or voice and text, and shown in parenthesis in Table 1) may be associated with a given type of remote alert ID.

TABLE 1

| Registered Client | Active Client | Client ID | Vehicle-Type ID (M/M/Y/E) | Remote Alert ID |
|---|---|---|---|---|
| 130 | Yes | Unique address 1 | 1/A/2011/44 | MIN-1 (Voice and Text) |
| 170 | Yes | Unique address 2 | 3/ZZ/2007/57 | MIN-2 (Text), E-mail address 1 MIN-4 (Voice) |
| 180 | Yes | Unique address 3 | 1/A/2011/44 | None |
| 185 | No | Unique address 4 | None | MIN-4 (Text) |

Central library 622 contains CVD 624 captured by a client and data tags 626 associated with the CVD 624. Associating the data tags of data tags 626 with CVD 624 may be carried out by processor 602 executing tagging CRPI 618 or a processor within a client, such as processor 502, executing tagging CRPI 524 at the client prior to the CVD being transmitted to server 600.

CVD 624 may comprise CVD that server 600 receives in response to server 600 transmitting a data-request message to a client, and/or CVD that a client transmits to server 600 without the client receiving a request for the CVD. Multiple clients can provide CVD for storage as CVD 624. Preferably, those multiple clients are registered clients, but server 600 is not so limited as it is possible for an unregistered client to capture vehicle data for storage as CVD 624. In accordance with the description above, CVD 624 may, for example, comprise CKP sensor data and data tags associated with the CKP sensor data or some other type of vehicle data that can be captured by a client.

IV. Example Captured Vehicle Data (CVD) and Data Tags

FIG. 10 and FIG. 11 illustrate examples of CVD displayed on a display device 504A of user interface 504, and example data tags associated with the CVD. For purposes of describing these figures, the CVD will be referred to as CKP sensor data, but a person having ordinary skill in the art will understand that the CVD may be some other type of vehicle data. The vertical division lines on the left side of display device 504A represent divisions of voltage, whereas the horizontal division lines on the bottom of display device 504A represent divisions of time. Such vertical and horizontal division lines are commonly located on oscilloscope displays and often extend to opposite sides of the display device.

In FIG. 10, the CKP sensor data is displayed as a waveform 1000 on display device 504A. As an example, waveform 1000 may represent CKP sensor data contained in encoded messages received at vehicle interface 506 from an ECU on a vehicle comprising the CKP sensor. The encoded message may, for example, be transmitted via universal asynchronous receiver transmitter (UART) circuitry within the vehicle and may be received by UART circuitry at vehicle interface 506. As another example, waveform 1000 may represent a voltage signal that vehicle interface 506 received via a volt meter probe in contact with a signal wire extending between the ECU and the CKP sensor.

In FIG. 11, the CKP sensor data is displayed as a waveform 1100 on display device 504A. As an example, waveform 1100 may represent CKP sensor data contained in encoded messages received at a second vehicle interface from an ECU on a second vehicle comprising a CKP sensor. The second vehicle interface being in a client system other than the client system that captured the CVD displayable as waveform 1000, and the second vehicle being a vehicle other than the vehicle that provided the CVD displayable as waveform 1000. The encoded message may, for example, be transmitted via UART circuitry within the second vehicle and may be received by UART circuitry at the second vehicle interface. As another example, waveform 1100 may represent a voltage signal that the second vehicle interface received via a volt meter probe in contact with a signal wire extending between the ECU and the CKP sensor in the second vehicle.

FIG. 10 illustrates data tags 1010 that are associated with the CVD displayed as waveform 1000, whereas FIG. 11 illustrates data tags 1110 that are associated with the CVD displayed as waveform 1100. By way of example, data tags 1010 and 1110 include a Request ID tag 1012, a Client Settings tag 1014, a Vehicle Type tag 1016, a VIN tag 1018, a Requested/CVD tag 1020, a Vehicle Operating Parameters tag 1022, a Diagnostic Trouble Code (DTC)—history tag 1024, a DTC—current tag 1026, a Mode $06 Data tag 1028, a Miscellaneous tag 1030, a Vehicle Symptom tag 1032, a Test Configuration tag 1034, and a User Input tag 1036. One or more of the foregoing data tags may comprise multiple data tags, such as Client Settings tag 1014 having a volts tag and a time tag.

The Request ID tag 1012 of data tags 1010 indicates No_Request, whereas the Request ID tag 1012 of data tags 1110 is 000999. The tag indicating No_Request may be associated with CVD in situations in which vehicle data was not captured in response to a data-request message. A numerical tag (e.g., the tag indicating 000999) may be associated with CVD in situations in which vehicle data was captured in response to a data-request message (e.g., data-request message 700) that includes the 000999 tag within the Request ID field 730. Each Request ID tag may be a unique combination of characters (e.g., letters, numbers and/or symbols) to differentiate between multiple requests for vehicle data.

The Client Settings tag 1014, Vehicle Type tag 1016, and Requested/CVD tag 1020 are identical in data tags 1010 and 1110. The revolutions per minute (RPM) and coolant temperature tags of Vehicle Operating Parameters tag 1022 and the ambient temperature and elevation tags of Miscellaneous tag 1030 differ between data tags 1010 and data tags 1110. In this regard, the CVD displayed as waveforms 1000 and 1100 (i.e., CKP sensor data) were captured (i) via two clients using the same client settings (i.e., a volts/division of 2 volts DC per division, and a time/division of 500 ms/division), and (ii) from vehicles of the same model year, make and model.

The vehicle from which data was captured to generate waveform 1000 was operating at 2,100 RPM and with a coolant temperature of 86° F. That vehicle was operating in an environment with an ambient temperature of 17° F. and an elevation of 75 meters above sea level. The vehicle from which data was captured to generate waveform 1100 was operating at 2,000 RPM and with a coolant temperature of 93° F. That latter vehicle was operating in an environment with an ambient temperature of 23° F. and an elevation of 811 meters above sea level.

VIN tag 1018 may identify a unique vehicle identification number (VIN) that is associated with the vehicle from which the vehicle data was captured. Alternatively, the VIN tag may include only a portion of the vehicle's YIN, such as the first 12 characters of the VIN, or some other portion of the VIN. VIN tag 1018 may be decoded so as to obtain information such as the model year, make, and model of the vehicle such that data tags 1010 and 1110 do not need to contain vehicle-type tags 1016 as data tags separate from VIN tag 1018. YIN tags 1018 of data tags 1010 and 1110 indicate that the vehicles that provided data to generate waveforms 1000 and 1100 are distinct vehicles having different VIN.

DTC-history tags 1024 and DTC-current tags 1026 may identify any diagnostic trouble codes that were previously set or currently set in the vehicle from which the vehicle data was captured. As an example, FIG. 10 illustrates that DTC P0336 (e.g., Crankshaft Position Sensor-A Circuit Range/Performance DTC) was set as a current DTC at the time the vehicle data was captured.

Mode $06 Data tag 1028 is an example of additional data that can be captured from encoded messages received from the vehicle. Mode $06 data is diagnostic data defined by SAE standard J1979. TID represents a test identifier. CID represents a component identifier. The Mode $06 data may include a pass/fail identifier as well. Data tags associated with CVD, such as data tags 1010 and 1110, may include other data of encoded messages transmittable by a vehicle and that other data may be defined by SAE standard J1979, some other open standard, or a vehicle manufacturer's proprietary standard.

Miscellaneous tag 1030 may identify information that client 500 receives via user interface 504 or vehicle interface 506, or via other components within client 500. Those other components could include a global positioning system (GPS) receiver for determining a GPS location of client 500. The GPS location could be included within Miscellaneous tag 1030.

User Input tag 1036 may identify data tags that a user of client 500 enters via user interface 504 to associate with CVD. By ways of example, a tag indicating that the "engine is misfiring" may be entered, for example, via a keyboard, keypad or microphone of user interface 504. Requested/CVD tag 1020 identifies the type of CVD being displayed as waveforms 1000 and 1100.

A client user can compare the data tags 1010 and tags 1110 to determine whether the differences in any of the data tags might explain any differences in the waveforms generated from CVD associated with those data tags.

IV. Example Operation

Figure 12:
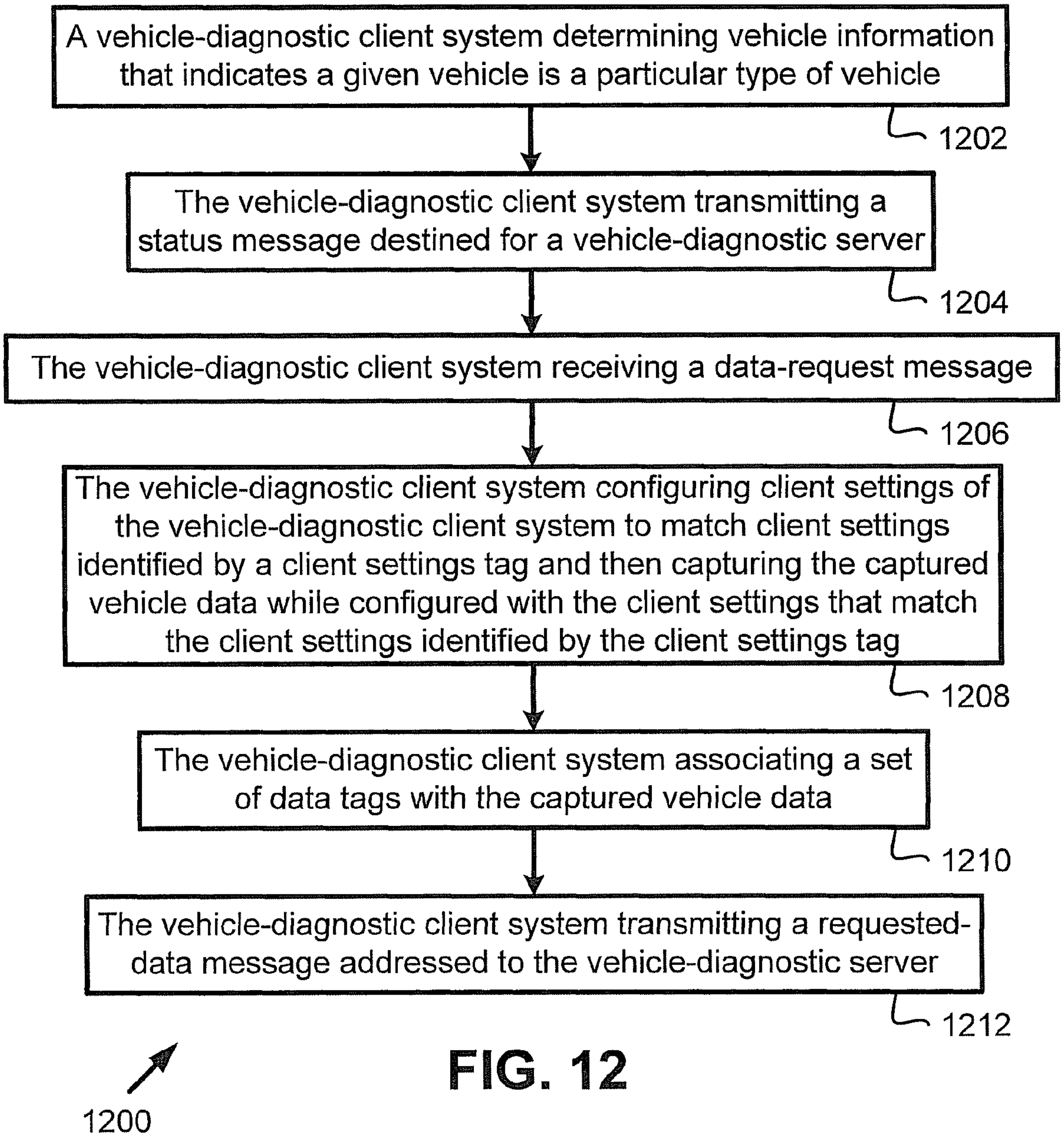
FIG. 12 is a flow chart depicting a set of functions that can be carried out in accordance with an example embodiment.

FIG. 12 is a flow chart depicting an example set of functions 1200 that may be carried out in accordance with an example embodiment. The set of functions 1200 refer to a vehicle-diagnostic client system, a vehicle-diagnostic server, and a given vehicle. For simplicity, the following description of FIG. 12 refers to the vehicle-diagnostic client system as client 130, the vehicle-diagnostic server as server 150, and the given vehicle as vehicle 110. Since client 130 may be arranged as client 500 and server 150 may be arranged as client 600, components of client 500 and server 600 are used to describe the set of functions 1200.

Block 1202 includes client 130 determining vehicle information that indicates vehicle 110 is a particular type of vehicle. Determining that vehicle information may comprise client 130 determining at least a portion of the vehicle information from vehicle information that client 130 receives from vehicle 110 via client/vehicle interface 120. Additionally or alternatively, determining the vehicle information may comprise client 130 determining at least a portion of the vehicle information via user interface 504. The determined vehicle information may, for example, include information that identifies the make (e.g., the manufacturer), model, model year, engine, and transmission of vehicle 110. Other examples of the vehicle information are also possible.

Next, block 1204 includes client 130 transmitting a status message destined for server 150. The status message, transmitted via network 140, comprises the vehicle information determined by client 130 at block 1202, and may be one of a plurality of status messages that client 130 transmits over a period of time to inform server 150 that client 130 is an active client within the community of clients of system 100. The vehicle information placed into the status messages may remain the same so long as client 130 remains communicatively coupled to a given vehicle or a given type of vehicle, but the vehicle information placed into subsequent status messages preferably comprises different vehicle information in response to client 130 no longer being communicatively coupled to the given vehicle or the given vehicle type, and client 130 being communicatively coupled to another vehicle, a vehicle of another vehicle type, or no vehicle.

Next, block 1206 includes client 130 receiving a data-request message, such as data-request message 700 including data tags field 740. Data tags field 740 may include one or more data tags selected from data tags 1010, but is not so limited. In many cases, data tags field 740 includes Vehicle Type tag 1016 and Requested/CVD tag 1020. If Test Configuration tag 1034 is not included within data tags field 740 or indicates standard test configuration, then client 130 may be arranged to use a standard test configuration when capturing CVD in response to receiving data-request message 700. Alternatively, if Test Configuration tag 1034 indicates custom test configuration, then client 130 may be arranged to configure itself to capture CVD after setting client 130 to client setting that match those specified by Client Settings tag 1014 included within data tags field 740.

For example, data tags field 740 may include Client Setting tags 1014 for configuring client 130 to capture vehicle data from vehicle 110. Configuring client 130 may include configuring client 130 to operate in a particular mode to capture vehicle data, such as a direct current (DC) voltage capture mode, an alternating current (AC) voltage capture mode, a resistance measurement capture mode, or an encoded diagnostic message request mode (e.g., to request a mode $06 diagnostic message or some other diagnostic mode). As another example, data tags field 740 may include Vehicle Operating Parameter tags 1022 that identify preferred operating parameters for operating vehicle 110 while client 130 captures the CVD from vehicle 110. User interface 504 may visually present the Vehicle Operating Parameter tags 1022 so that a user is notified which operating parameters to use when capturing CVD from vehicle 110.

Next, block 1208 includes client 130 configuring its client settings to match client settings identified by Client Setting tags 1014 and then capturing vehicle data while configured with the client settings that match the client settings identified by Client Setting tags 1014. In the event that client 130 cannot automatically configure one or more client settings, such as a client setting in which a particular connector of client/vehicle interface 120 is to be connected to vehicle interface 506, processor 502 may execute program instructions that cause user interface 504 to present (e.g., display) a prompt notifying a user to carry out the manual client configuration. For purposes of describing the set of functions 1200, the CVD captured from vehicle 110 at block 1208 is referred to as first CVD.

Next, block 1210 includes client 130 associating data tags with the first CVD. Client 130 may store the first CVD within local library 514 and the data tags associated with the first CVD in tags 516. The data tags associated with the first CVD may include one or more data tags that are identical to the data tags of data tags field 740, as well as (i) one or more data tags that differ from the data tags of data tags field 740, or (ii) one or more data tags that were not included within data tags field 740.

The data tags associated with the first CVD may include Client Settings tag 1014 that indicate how client 130 was configured while capturing the first CVD. The data tags associated with the first CVD may include Vehicle Operating Parameter tags 1022 that identify operating parameters of vehicle 110 while client 130 captured the first CVD. Vehicle Operating Parameter tags 1022 may include an RPM parameter and a coolant temperature parameter, as shown in FIG. 10, but may include other vehicle operating parameters as well.

The data tags associated with the first CVD, as well as the data tags identified in data tags field 740 of data-request message 700, may each include Request ID tag 1012. As an example, those Request ID tags may each identify a common request identifier, such as 000999. The common request identifier (e.g., 000999) can be used by server 150 to determine that the first CVD associated with the data tags associated with the first CVD are vehicle data captured in response to data-request message 700 comprising data tags field 740 with the common request identifier (e.g., 000999).

Next, block 1212 includes client 130 transmitting a requested-data message addressed to server 150. The requested-data message, which may be arranged as requested-data message 800, comprises the first CVD, and may comprise other data such as the data tags associated with the first CVD. After storing the first CVD at data storage device 510, client 130 may capture second CVD from another vehicle and retrieve the first CVD from data storage device 510. Client 130 may visually present the first CVD via a display device of user interface 504. Client 130 may simultaneously visually present the first CVD and the second CVD via the display device of user interface 504.

Figure 13:
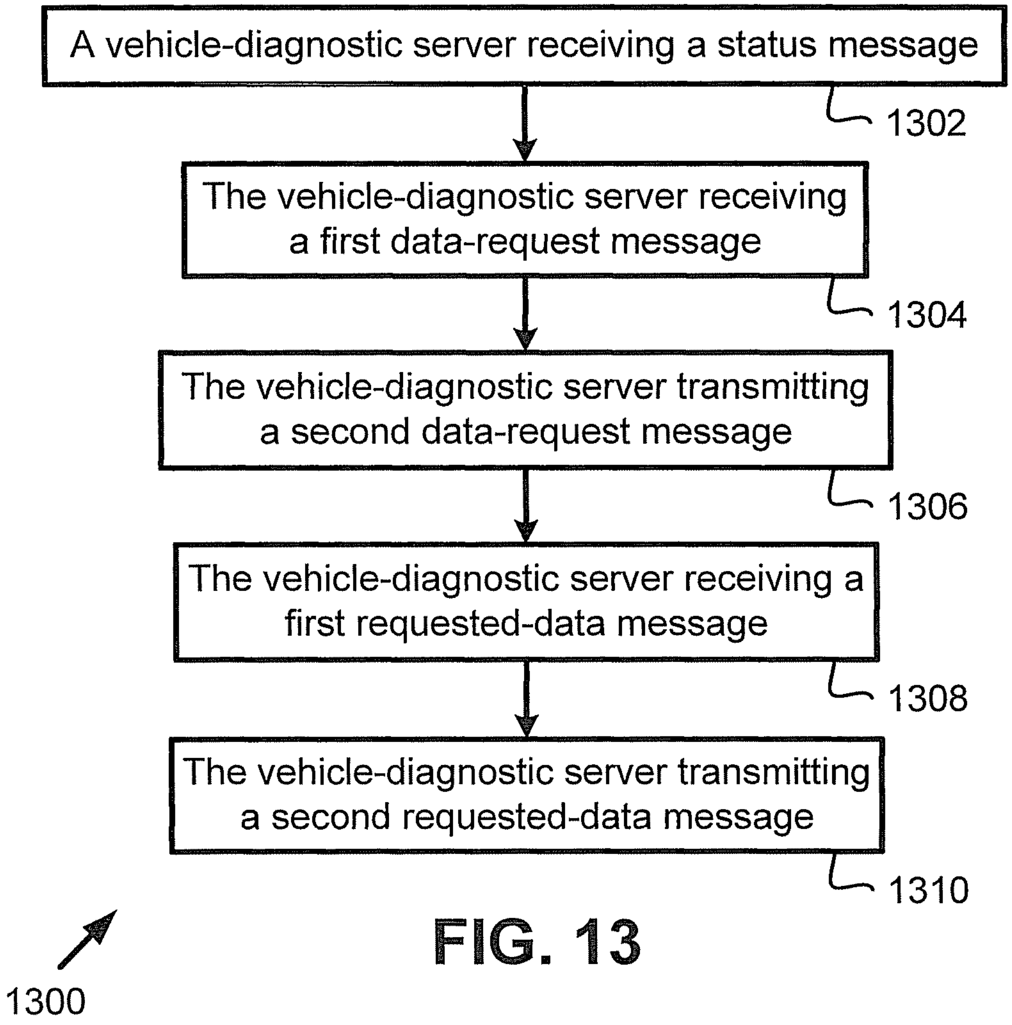
FIG. 13 is a flow chart depicting another set of functions that can be carried out in accordance with an example embodiment.

Next, FIG. 13 is a flow chart depicting an example set of functions 1300 that may be carried out in accordance with an example embodiment. The set of functions 1300 refer to a vehicle-diagnostic server. For simplicity, the following description of FIG. 13 refers to the vehicle-diagnostic server as server 150. Since server 150 may be arranged as client 600, components of server 600 are used to describe the set of functions 1300. The set of functions 1300 also refer to data-request messages and requested-data messages. Each data-request message comprises a request for CVD. Each requested-data message comprises CVD or data based on CVD, such as a statistical representation of CVD.

Block 1302 includes server 150 receiving a status message (e.g., status message 404 transmitted by client 180). Status message 404 may comprise a vehicle identifier that identifies a particular vehicle-type of vehicle 190 to which client 180 is communicatively coupled. The vehicle identifier may comprise data tags arranged as Vehicle Type tags 1016. In response to receiving status message 404, server 150 may modify client register 620 to indicate that vehicle 190 is accessible via client 180 and to include the vehicle identifier information associated with vehicle 190. In that way, if server 150 receives a data-request message with a request for CVD from a vehicle matching the particular vehicle-type of vehicle 190, server 150 can search client register 620 so as to determine that the CVD can be requested from vehicle 190 by way of client 180.

Next, block 1304 includes server 150 receiving a first data-request message (e.g., data-request message 410 transmitted from client 130). Data-request message 410, which may be arranged as data-request message 700, may comprise Vehicle Type tags 1016 that identify a vehicle-type of a vehicle from which CVD is desired (e.g., the vehicle-type associated with vehicle 190). Data-request message 410 may also comprise (i) a Test Configuration tag 1034 that indicates Standard Test Configuration, or (ii) a Test Configuration tag 1034 that indicates Custom Test Configuration, and Client Setting tags for configuring a client to capture CVD according to client settings desired by a user of client 130. Data-request message may also comprise destination ID field 710 including a unique address associated with server 150 and source ID field 720 including a unique address associate with client 130.

In response to receiving data-request message 410, server 150 may search central library 622 to determine whether CVD 624 includes CVD that matches the vehicle data requested via data-request message 410. If so, server 150 may generate and transmit requested-data message 800 to client 130 so as to provide client 130 with CVD from CVD 624. On the other hand, if CVD 624 does not include CVD that matches the vehicle data requested via data-request message 410 and/or if server 150 determines it should request CVD in response to receiving data-request message 410, server 150 may search client register 620 so as to identify which active client(s), if any, have access to a vehicle of the particular vehicle-type. For purposes of this description, during the search of client register 620, server 150 determines that client 180 is communicatively coupled to vehicle 190 (i.e., a vehicle that is the particular vehicle-type).

Next, block 1306 includes server 150 transmitting a second-data request message (e.g., message 416). Data-request message 416, which may be arranged as data-request message 700, may comprise the same fields and the same data in data-request message 416 except that destination ID field 710 includes a unique address associated with client 180 and source ID field 720 includes a unique address associate with server 150. Server 150 may generate data-request message 416 in response to server 150 identifying that vehicle 190 (i.e., a vehicle of the particular vehicle-type) is accessible via client 180.

After receiving data-request message 416, client 180 captures CVD from vehicle 190. Client 180 can store the CVD captured from vehicle 190 in its local data storage device. Client 180 can also generate a requested-data message 420 for transmitting to server 150 in response to receiving data-request message 416.

Next, block 1308 includes server 150 receiving a first requested-data message (e.g., requested-data message 420). Requested-data message 420, which may be arranged as requested-data message 800, may comprise destination ID field 810 including a unique address associated with server 150, source ID field 820 including a unique address associate with client 180, request ID field 830, data tags field 840 including the data tags associated with the CVD captured from vehicle 190, and CVD field 850 including the CVD that client 180 captured from vehicle 190 while client 180 was configured to client settings indicated by the Client Setting tags 1014 of data tags field 840.

After receiving requested-data message 420, server 150 may analyze the data tags field 840 and central library 622 to determine whether CVD 624 includes a category of CVD in which the CVD captured from vehicle 190 should be stored.

If CVD 624 includes no such category, server 150 may generate a new CVD category for storing the CVD captured from vehicle 190. Otherwise, if CVD 624 includes one or more categories associated with the CVD captured from vehicle 190, then server 150 may store the CVD captured from vehicle 190 within those one or more CVD categories and/or associate the CVD captured from vehicle 190 with those one or more CVD categories. Afterwards, server 150 may execute analysis CRPI 630 with respect to the CVD captured from vehicle 190 and/or the CVD category in which the CVD captured from vehicle 190 was stored or associated with.

Next, block 1310 includes server 150 transmitting a second requested-data message (e.g., requested-data message 424). Requested-data message 424, which may be arranged as requested-data message 800, may comprise the same fields and the same data in requested-data message 420 except that destination ID field 810 includes a unique address associated with client 130 and source ID field 820 includes a unique address associate with server 150.

After receiving the CVD captured from vehicle 190, client 130 may visually present the CVD via user interface 504. Client 130 may capture CVD from vehicle 110 and visually present the CVD captured from vehicle 110 at the same time client is displaying the CVD captured from vehicle 190. This allows a vehicle technician to compare the CVD from vehicles 110 and 190 for any of a variety of reasons, one of which may be diagnosing a customer complaint with vehicle 110.

V. Data Analysis

Server 600 may carry out a variety of data analysis functions when processor 602 executes analysis CRPI 630 based on CVD 624. The analysis functions may be performed separately for each distinct category of CVD and/or for each distinct vehicle from which CVD was captured for the distinct category. Moreover, the analysis functions may be repeated for any given category of CVD each time server 600 receives additional CVD for that given category of CVD.

Figure 17:
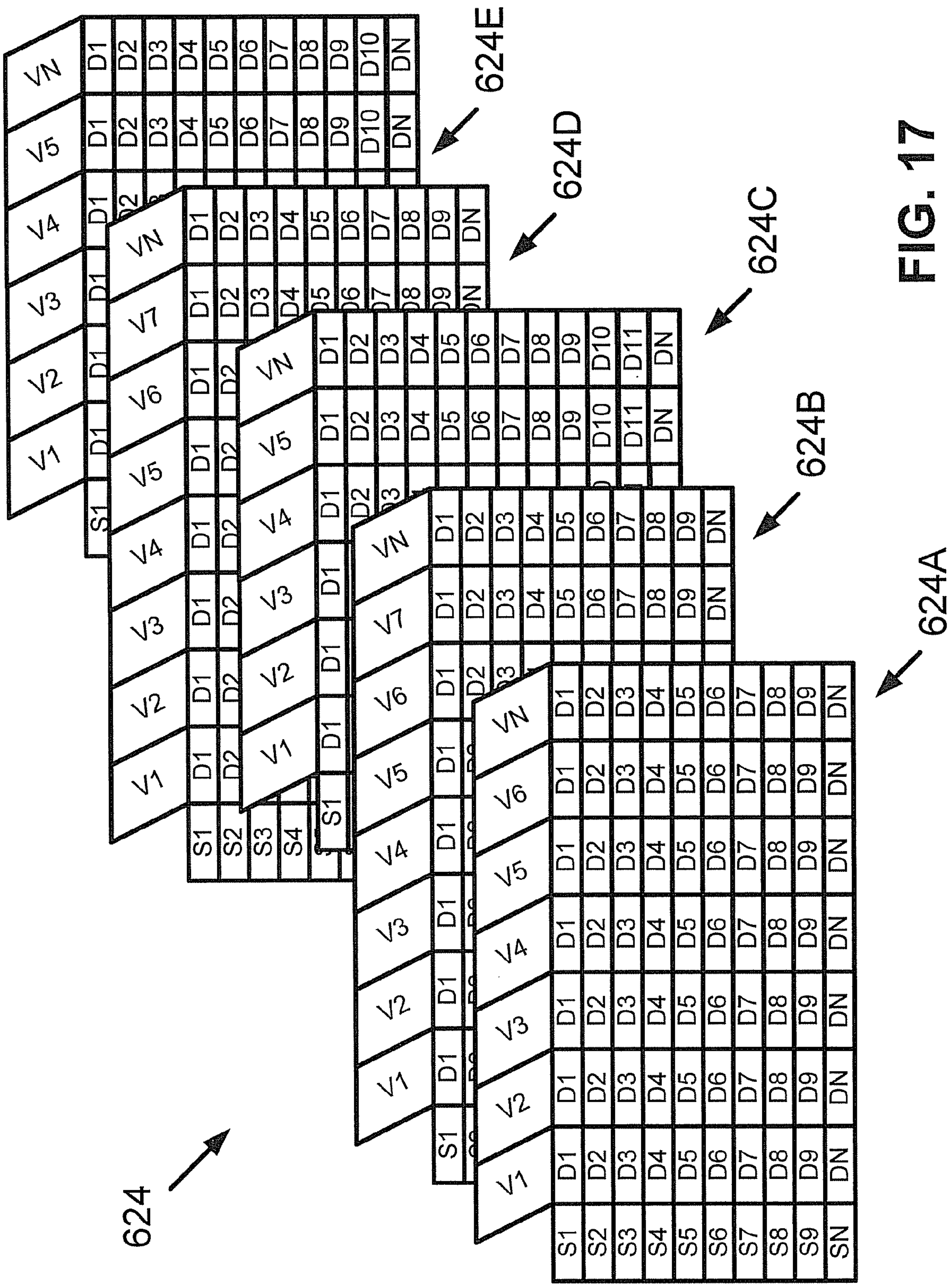
FIG. 17 illustrates examples of multiple categories of captured vehicle data.

FIG. 17 illustrates an example of CVD 624 comprising distinct categories of CVD 624A, 624B, 624C, 624D, and 624E. As an example, CVD 624A may comprise CKP sensor data captured from vehicles known as a 2010 model year Chevrolet Corvette, CVD 624B may comprise CKP sensor data captured from vehicles known as a 2009 model year Chevrolet Corvette, CVD 624C may comprise mass air flow sensor data captured from vehicles known as the 2010 model year Chevrolet Corvette, CVD 624D may comprise CKP sensor data captured from vehicles known as a 2009 model year Chevrolet Camaro, and CVD 624E may comprise CKP sensor data captured from vehicles known as a 2010 model year Honda Accord.

In FIG. 17, "S" represents "sample," "V" represents "vehicle," "D" represents "data," and "N" represents a maximum number. When used with "S" for a given CVD category, "N" represents the maximum number of CVD samples for that CVD category. Within each category of CVD, each data value shown with the same number may correspond to the other data values shown with the same number. Determining which data values are corresponding data values allows for improved data analysis. As an example, corresponding data values may each have been captured a specific amount of time after first data values associated with those corresponding data values were captured.

Each category of CVD comprises CVD captured from N quantity of vehicles. The quantity of vehicles for each category need not be the same as evident by FIG. 17. Additionally, the quantity of samples of CVD captured for each vehicle need not be the same as evident by FIG. 17. For instance, the quantity of samples shown for each vehicle of CVD 624A is 10 samples, whereas the quantity of samples shown for each vehicle of CVD 624C is 12. A person having ordinary skill in the art will understand that the actual number of samples may differ from the number of samples illustrated in FIG. 17 and may be much greater than 12 samples.

Execution of analysis CRPI 630 may result in splitting a category of CVD into multiple categories of CVD. The splitting of CVD categories may be based on tags associated with CVD included within a given category of CVD. For example, the given category of CVD may comprise CVD samples of CVD from a first model year (2011) of a given make and model vehicle and samples of CVD from a second model year (e.g., 2010) of the given make and model year. Processor 602 may determine that the model year 2011 samples of CVD are from at least a threshold number of vehicles and/or that the model year 2010 samples of CVD are from at least the threshold number of vehicles, and responsively split the given category of CVD into a category of CVD for the 2011 model year vehicle and another category of CVD for the 2010 model year vehicle. Processor 602 may use other tags associated with the CVD, such as vehicle symptom tags, to determine that the CVD should be split into multiple categories of CVD.

Additionally, execution of CRPI 630 may result in combining multiple categories of CVD into a single category of CVD. The combining of CVD categories may be based on tags associated with CVD included within the multiple categories of CVD. For example, each of the multiple categories of CVD may comprise samples of data for a common vehicle component (e.g., a CKP sensor), but for different model years of a common vehicle make and model.

Next, FIG. 18 illustrates an example of CVD 624A and, in the far right column and the bottom two rows, statistical data determined by executing analysis CRPI 630 to analyze vehicle data 624A. The CVD 624A comprises N data samples for N vehicles. Although FIG. 18 illustrates only 10 samples for each vehicle and 7 vehicles, a person skilled in the art will understand that the quantity of sample need not be 10, but may be another number, such as a number in the thousands, tens of thousands, or hundreds of thousands. Additionally, a person skilled in the art will understand that the number of vehicles need not be 7, but may be another number other than 7.

By way of example, the data values in CVD 624A may represent DC voltage measurements pertaining to a CKP sensor. In that regard, the first sample for each vehicle in FIG. 18 may represent a measurement of 1 volt DC. The first sample for each vehicle may be an identical voltage as the client device(s) that obtained CVD 624A may each have been setup to use a 1 volt DC (increasing direction) trigger to begin capturing the vehicle data.

The CVD from each vehicle may be associated with a respective Vehicle Symptom tag 1032. For CVD 624A, by way of example, the samples for vehicles 1, 4, and N may be associated with a vehicle symptom tag such as Engine Hesitation, the samples for vehicle 6 may be associated with a vehicle symptom tag such as Engine Does Not Start, and the sample for vehicles 2, 3, and 5 may be associated with a normal operation tag that indicates the vehicle, from which the vehicle data was captured, was operating normally (i.e., not malfunctioning).

Execution of analysis CRPI 630 may cause any of a variety of statistical data to be generated. The statistical data may include, as shown in FIG. 18, a respective statistical mean and standard deviation calculated for each row of data values (i.e., corresponding data values). The statistical data may also include, as shown in FIG. 18, a sum of variances (i.e., Var. Sum) for each vehicle. Each variance is the absolute value of the difference between the $n^{th}$ sample and the mean of the $n^{th}$ samples, for values of n from 1 to N. For example, the variances for the N samples captured for Vehicle 5 are 0.0, 0.3, 0.4, 0.5, 0.7, 0.5, 0.0, 0.4, 0.2, and 0.8. The sum of those variances for Vehicle 5 is 3.8.

The statistical data may also include, as shown in the bottom FIG. 18, a number of samples within 1 standard deviation of the mean for each sample position. The vehicle(s) having the greatest number of samples within 1 standard deviation of the statistical mean is/are the vehicles that provided CVD that most closely match the statistical mean data. 10 of the CVD samples for vehicle 3 are within 1 standard deviation of the statistical means. Processor 602 may use such data to make a determination that the CVD from vehicle 3 most closely matches the statistical means and should be provided to client 130 in response to data request message 700.

Execution of analysis CRPI 630 may result in processor 602 selecting particular CVD to be transmitted to a client 130 in response to a data request message. In one respect, the particular CVD transmitted to client 130 may comprise the samples of CVD 624A that most closely match the statistical mean of the CVD. In accordance with the example data shown in FIG. 18, the CVD from vehicle 3 most closely matches the statistical mean as the sum of the variances for that data is the lowest sum of variances for CVD 624A. Additionally, the CVD from vehicle 3 has the most sample (i.e., 10 samples) within 1 standard deviation of the statistical means calculated for CVD 624A.

In another respect, the particular CVD transmitted to client 130 may comprise the samples of CVD 624A that are associated with a vehicle symptom identifier included within data request message 700. For example, if data request message 700 includes a vehicle symptom tag of Engine Does Not Start, the particular CVD transmitted to client 130 may comprise the samples of vehicle data captured from vehicle 6 since those samples are associated with that vehicle symptom tag.

In yet another respect, the particular CVD transmitted to client 130 may comprise a statistical representation of some or all of CVD 624A. For example, the statistical representation may comprise the statistical means of each sample for vehicles 1 to N. As another example, the statistical representation may comprise statistical minimum and statistical maximum representations. The statistical minimum may be determined, for example, by subtracting (1, 2, or 3 times the standard deviation) from each statistical mean of the samples. For sample 2, the statistical minimum using 2 times the standard deviation may be determined as the statistical mean (i.e., 1.3) minus (2 times the standard deviation of 0.09) which equals 1.12. The statistical maximum may be determined, for example, by adding (1, 2, or 3 times the standard deviation) to each statistical mean of the samples. For sample 2, the statistical maximum using 2 times the standard deviation may be determined as the statistical mean (i.e., 1.3) plus (2 times the standard deviation of 0.09) which equals 1.32.

Figure 19:
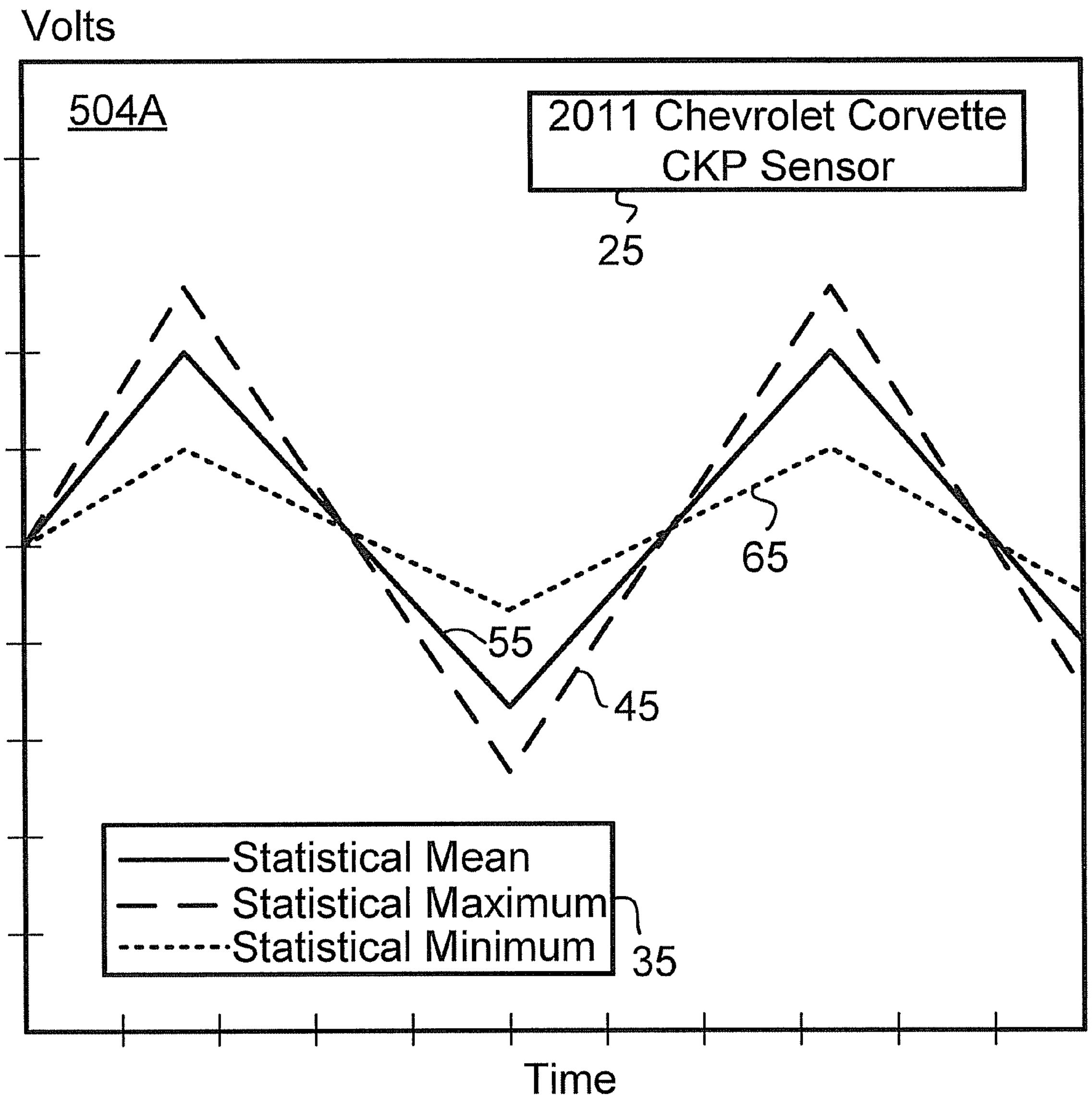
FIG. 19 illustrates the displaying of captured vehicle data.

Next, FIG. 19 illustrates CVD being displayed as waveforms 45, 55, and 65 on display device 504A. A CVD identifier region 25 that identifies the type of CVD being displayed, and a legend 35 that includes data to distinguish between multiple displayed waveforms may also be displayed on display device 504A. For example, legend 35 may include data to identify a waveform representing a statistical mean of the CVD, a waveform representing a statistical maximum of the CVD, and a statistical minimum of the CVD. User interface 504 may include input devices operable by a user to cause the identifier region 25 and/or the legend 35 to be moved to another position on display device 504A and to turn on (e.g., to start displaying) or to turn off (e.g., to stop displaying) identifier region 25 and/or legend 35.

Waveforms 45, 55, and 65 may include waveform portions not being displayed on display device 504A, such as portions of waveform prior to the left-hand most portions of waveforms 45, 55, and 65 and portions of waveforms after the right-hand most portions of waveforms 45, 55, and 65. The amount of CVD used to generate each portion of waveforms 45, 55, and 65 can be referred to as a frame of CVD. Accordingly, the CVD for each waveform may include multiple frames of CVD.

The following equation may be used to determine how many samples (data values) of CVD are stored for a given vehicle within a category of CVD.

$$\text{Samples (data values) of } CVD = \frac{\text{Seconds of } CVD \times \text{Samples (data values) per frame}}{\text{Time per frame}}$$

As an example, if each time division on display device 504A is set to 100 ms such that the time per frame is 1.1 seconds and each frame of data comprises 590 samples (data values), then for 11 seconds of CVD, the number of samples (data values) of CVD equals 11 seconds times 590 samples per frame divided by 1.1 seconds per frame equals 5,900 samples (data values). A skilled person in the art will thus understand that the amount of CVD stored for a given signal and given vehicle may include more samples than the example data shown in FIG. 17 and FIG. 18.

Furthermore, processor 502 may execute guidance CRPI 526 and/or processor 602 may execute guidance CRPI 632 to guide a vehicle technician in regard to local CVD captured by client 500 being used by the vehicle technician. Execution of the guidance program instructions may include comparing the local CVD with community CVD from central library 622 and, based on that comparison, determining that a particular portion of vehicle 110 should be repaired or replaced. For example, the determination may be based on the local CVD having more than a threshold number of samples (data values) greater than a corresponding statistical maximum value of the community CVD and/or more than a threshold number of samples less than a corresponding statistical minimum value of the community CVD.

As another example, execution of the guidance CRPI may include comparing the local CVD to the respective CVD captured from one or more vehicles in category of CVD 624A so as to determine which CVD most closely matches the local CVD. As an example, that determination may be based on the absolute value of the sum of differences between corresponding samples in the local CVD and the community CVD. Table 2 illustrates example local CVD samples corresponding to the samples of CVD from Vehicle 6 in CVD 624A, and the determined absolute value of differences between those samples. The sum of those differences is 1.4. For purposes of this description, that sum is the lowest sum of differences between the local CVD and the CVD of 624A. Accordingly, the CVD from Vehicle 6 is considered to match most closely to the local CVD.

TABLE 2

| | Sample | | | | | | | | | |
|---|---|---|---|---|---|---|---|---|---|---|
| | 1 | 2 | 3 | 4 | 5 | 6 | 7 | 8 | 9 | N |
| Vehicle 6 of CVD 624A | 1.0 | 0.9 | 1.0 | 0.7 | 1.4 | 3.7 | 3.7 | 2.6 | 0.0 | 0.0 |
| Local CVD | 1.0 | 1.0 | 1.1 | 0.5 | 1.3 | 3.9 | 4.0 | 2.8 | 0.2 | 0.0 |
| Absolute Value of Difference | 0.0 | 0.1 | 0.1 | 0.2 | 0.1 | 0.2 | 0.3 | 0.2 | 0.2 | 0.0 |

The CVD captured from each vehicle may be associated with diagnostic tags. The diagnostic tags may indicate what diagnostic diagnosis and/or procedure was taken to resolve a malfunction occurring in the vehicle from which the CVD was captured. As an example, the CVD from Vehicle 6 may be associated with a diagnostic tag that indicates the CKP sensor was replaced with a new CKP sensor or a repair to an electrical circuit to the CKP sensor was repaired to correct an engine hesitation complaint associated with Vehicle 6. Upon determining that the CVD from Vehicle 6 most closely matches the local CVD, execution of the guidance CRPI 526 may cause user interface 504 to display data regarding a particular portion of vehicle 110 that should be repaired or replaced. For example, user interface 504 may display data, such as text that states "Replace CKP Sensor" or "CKP sensor is malfunctioning, repair open in circuit number 837." As another example, user interface 504 may visually display an image of the CKP sensor to be replaced and/or an image showing the location where the CKP sensor or identified circuit is located within the vehicle. Other examples of data displayable as a result of executing guidance CRPI are also possible.

VI. Conclusion

Example embodiments have been described above. Those skilled in the art will understand that changes and modifications may be made to the described embodiments without departing from the true scope and spirit of the present invention, which is defined by the claims.

We claim:

1. A client system for vehicle diagnostics, the client system comprising:

a non-transitory computer-readable medium;

a network interface configured to receive a first request-alert transmitted over a network from a vehicle-diagnostic server, wherein the first request-alert identifies a particular vehicle-type and a vehicle data type of vehicle data to be captured, subsequent to the network interface receiving the first request alert, by the client system from a vehicle that is the particular vehicle-type identified by the first request-alert;

a user interface configured to visually present the first request-alert that is received using the network interface and that identifies the particular vehicle-type and the vehicle data type of vehicle data to be captured by the client system;

a client/vehicle interface configured to receive vehicle data storable in the computer-readable medium as first captured vehicle data from the vehicle that is the particular vehicle-type identified by the first request-alert, wherein the first captured vehicle data comprises vehicle data of the vehicle data type identified by the first request-alert captured, subsequent to the network interface receiving the first request alert, from the vehicle that is the particular vehicle-type identified by the first request-alert;

program instructions stored at the non-transitory computer-readable medium and executable by at least one processor to associate a first set of one or more data tags with the first captured vehicle data; and wherein the network interface is configured to transmit a requested-data message including the first captured vehicle data and the first set of one or more data tags onto the network for transmission of the first captured vehicle data and the first set of one or more data tags from the client system to the vehicle-diagnostic server for storage in a network-based vehicle-diagnostics database that provides captured vehicle data collected from a community of client systems.

2. The client system of claim 1, further comprising:

program instructions stored at the non-transitory computer-readable medium and executable by at least one processor to:

generate a data-request message, wherein the data-request message comprises the first set of one or more data tags that are associated with the first captured vehicle data;

cause the network interface to transmit the data-request message to the vehicle-diagnostic server; and receive a requested-data message from the vehicle-diagnostic server, wherein the requested-data message comprises second captured vehicle data stored at the network-based vehicle-diagnostics database.

3. The client system of claim 1, further comprising:

other captured vehicle data stored at the non-transitory computer-readable medium; and program instructions stored on the non-transitory computer-readable medium and executable by at least one processor to determine whether a portion of the other captured vehicle data comprises captured vehicle data associated with a set of data tags that match the first set of one or more data tags, and if so, then present the portion of the other captured vehicle data via the user interface for comparison to the first captured vehicle data, but if not, then generate a data-request message that comprises the first set of one or more data tags and cause the network interface to transmit the data-request message to the vehicle-diagnostic server.

4. The client system of claim 1, further comprising program instructions stored on the non-transitory computer-readable medium and executable by at least one processor to:

receive, via the network interface, a data-request message transmitted from the vehicle-diagnostic server, wherein the data-request message indicates a vehicle-type identifier and one or more settings for the client system;

detect that the client system is connected to a vehicle matching the vehicle-type identifier and responsively:

(i) configure the client system according to the one or more settings;

(ii) receive, via the client/vehicle interface, vehicle data storable in the non-transitory computer-readable medium as second captured vehicle data for the vehicle matching the vehicle-type identifier;

(iii) associate a second set of one or more data tags with the second captured vehicle data; and (iv) cause the network interface to transmit a requested-data message to the vehicle-diagnostic server for storage in the network-based vehicle-diagnostics database that provides captured vehicle data collected from the community of client systems, wherein the requested-data message comprises the second captured vehicle data for the vehicle and the second set of one or more associated data tags.

5. The client system of claim 1, wherein the first captured vehicle data comprises vehicle data that is displayable on a display of the client system as a waveform.

6. The client system of claim 1, wherein a data tag of the first set of one or more data tags comprises (i) a vehicle identification number (VIN), (ii) a client setting for auto-configuring the client system, (iii) a history diagnostic trouble code set in the vehicle, (iv) a currently-pending diagnostic trouble code set in the vehicle, (v) a vehicle operating parameter of the vehicle, (vi) mode $06 diagnostic data, (vii) a user-defined data tag, (viii) an identifier of the captured vehicle data, or (ix) a vehicle-type identifier.

7. The client system of claim 1, the client system further comprising program instructions stored at the non-transitory computer-readable medium and executable by at least one processor to:

cause the network interface to transmit a second request alert to at least one remote alert device predefined as an alert device to receive request alerts from the client system, wherein the second request alert identifies the particular vehicle-type and the vehicle data type to be captured from a vehicle of the particular vehicle-type.

8. A server system for vehicle diagnostics, the server system comprising:

a non-transitory computer-readable medium; and program instructions stored at the non-transitory computer-readable medium and executable by at least one processor to:

(i) receive, via a network interface, requested-data messages from vehicle-diagnostic client systems, wherein each requested-data message comprises captured vehicle data and a set of one or more data tags associated with captured vehicle data within that requested-data message;

(ii) maintain a network-based vehicle-diagnostics database, wherein the captured vehicle data from each requested-data message is categorized in the vehicle-diagnostics database based on the data tags associated with the captured vehicle data within that requested-data message;

(iii) receive a first data-request message from a first vehicle-diagnostic client system, wherein the first data-request message comprises a first set of one or more data tags and a request-identifier;

(iv) determine, upon receipt of the first data-request message, that the network-based vehicle-diagnostics database does not comprise captured vehicle data associated with a set of data tags that matches the first set of one or more data tags;

(v) responsively generate a second data-request message, wherein the second data-request message indicates one or more settings for automatic configuration of a second vehicle-diagnostic client system that receives the second data-request message to capture vehicle data requested by the second data-request message;

(vi) cause the network interface to transmit the second data-request message to the second vehicle-diagnostic client system;

(vii) generate a first requested-data message that comprises the request-identifier received as part of the first data-request message, and first captured vehicle data stored at the network-based vehicle-diagnostics database and that is associated with a second set of data tags that matches the first set of one or more data tags within the first data-request message; and (viii) cause the network interface to transmit the first requested-data message to the first vehicle-diagnostic client system.

9. The server system of claim 8, further comprising:

program instructions stored at the non-transitory computer-readable medium and executable by at least one processor to:

receive another requested-data message from the second vehicle-diagnostic client system, wherein the another requested-data message comprises captured vehicle data to be stored as the first captured vehicle data and a set of data tags to be stored as the second set of data tags, wherein the first captured vehicle data was captured by the second vehicle-diagnostic client system while configured with the one or more settings indicated in the second data-request message; and store the first captured vehicle data and the second set of data tags that match the first set of one or more data tags in the network-based vehicle diagnostic database.

10. A method comprising:

determining, by a vehicle-diagnostic client system, vehicle information that indicates a given vehicle is a particular vehicle-type;

transmitting, by the vehicle-diagnostic client system, a status message destined for a vehicle-diagnostic server, the status message comprising the vehicle information determined by the vehicle-diagnostic client system;

receiving, by the vehicle-diagnostic client system, a data-request message transmitted over a communications network from the vehicle-diagnostic server, wherein the data-request message comprises a request-identifier and a first set of data tags including client setting tags for configuring the vehicle-diagnostic client system to capture first vehicle data from the given vehicle;

configuring, by the vehicle-diagnostic client system, client settings of the vehicle-diagnostic client system to match client settings identified by the client setting tags and then capturing the first vehicle data while configured with the client setting that match the client settings identified by the client setting tags;

associating, by the vehicle-diagnostic client system, a second set of data tags with the captured first vehicle data, wherein the second set of data tags include client tags that indicate how the vehicle-diagnostic client system was configured while capturing the first vehicle data; and transmitting, by the vehicle-diagnostic client system, a requested-data message addressed to the vehicle-diagnostic server, wherein the requested-data message comprises the captured first vehicle data, the second set of data tags, and the request-identifier received as part of the data-request message.

11. The method of claim 10, wherein the first set of data tags comprises a first set of vehicle operating parameter tags that indicate preferred vehicle operating parameters for operating the given vehicle while the vehicle-diagnostic client system captures the first vehicle data from the given vehicle, and wherein the second set of data tags comprises a second set of vehicle operating parameter tags that indicate operating conditions of the given vehicle while the vehicle-diagnostic client system captured the first vehicle data.

12. The method of claim 10, wherein determining the vehicle information that indicates the given vehicle is a particular vehicle-type comprises the vehicle-diagnostic client system determining at least a portion of the vehicle information from vehicle information the vehicle-diagnostic client system receives from the given vehicle via a client/vehicle interface.

13. The method of claim 10, further comprising:

the vehicle-diagnostic client system storing the captured first vehicle data and the second set of data tags at a data storage device of the vehicle-diagnostic client system;

subsequent to storing the captured first vehicle data at the data storage device of the vehicle-diagnostic client system, the vehicle-diagnostic client system capturing second vehicle data from a second given vehicle and retrieving the first captured vehicle data from the data storage device of the vehicle-diagnostic client system; and the vehicle-diagnostic client system visually presenting the first captured vehicle data via a display device of the vehicle-diagnostic client system.

14. The method of claim 13, further comprising:

the vehicle-diagnostic client system simultaneously visually presenting the captured first vehicle data and the captured second vehicle data via the display device of the vehicle-diagnostic client system.

15. The method of claim 10, further comprising:

the vehicle-diagnostic client system repeatedly transmitting status messages destined for a vehicle-diagnostic server to provide notice that the vehicle-diagnostic client system is an active client within a community of client systems.

16. The method of claim 10, wherein the second set of data tags further include data tags that identify operating parameters of the given vehicle while the vehicle-diagnostic system captured the first vehicle data.

17. A method comprising:

a vehicle-diagnostic server receiving a status message, wherein the status message comprises a source identifier associated with a first vehicle-diagnostic client system and comprises a vehicle identifier that identifies a particular vehicle-type of a given vehicle;

the vehicle-diagnostic server modifying a client register in response to receiving the status message, wherein modifying the client register includes modifying the register to indicate that a vehicle of the particular vehicle-type is accessible via the first vehicle-diagnostic client system;

the vehicle-diagnostic server receiving a first data-request message, wherein the first data-request message comprises a source identifier associated with a second vehicle-diagnostic client system and comprises client setting tags for configuring a vehicle-diagnostic client system and vehicle identifier tags that identifies the particular vehicle-type;

the vehicle-diagnostic server searching the client register in response to receiving the first data-request message, wherein searching the client register includes searching to identify any vehicle-diagnostic client system that has access to a vehicle of the particular vehicle-type;

the vehicle-diagnostic server transmitting a second data-request message, wherein the second data-request message comprises a destination identifier associated with the first vehicle-diagnostic client system and comprises the client setting tags for configuring a vehicle-diagnostic client system and the vehicle identifier tags that identifies the particular vehicle-type;

the vehicle-diagnostic server generating the second data-request message in response to the vehicle-diagnostic server identifying that the particular vehicle-type is accessible via the first vehicle-diagnostic client system;

the vehicle-diagnostic server receiving a first requested-data message, wherein the first requested-data message comprises the source identifier associated with the first vehicle-diagnostic client system and comprises vehicle data that the first vehicle-diagnostic client system captured from the given vehicle while configured to client setting represented by the client setting tags; and the vehicle-diagnostic server transmitting a second requested-data message, wherein the second requested-data message comprises a destination identifier associated with the second vehicle-diagnostic client system and comprises the vehicle data that the first vehicle-diagnostic client system captured from the given vehicle while configured to client setting represented by the client setting tags.

* * * * *